US008344849B2

(12) United States Patent
Larsson et al.

(10) Patent No.: US 8,344,849 B2
(45) Date of Patent: Jan. 1, 2013

(54) METHOD FOR PERFORMING DRIVER IDENTITY VERIFICATION

(75) Inventors: Petter Larsson, Ytterby (SE); Andreas Hagemann, Linköping (SE); Hanna Björk, Karlskrona (SE)

(73) Assignee: Volvo Technology Corporation, Göteborg (SE)

( * ) Notice: Subject to any disclaimer, the term of this patent is extended or adjusted under 35 U.S.C. 154(b) by 1077 days.

(21) Appl. No.: 11/995,335

(22) PCT Filed: Jul. 11, 2006

(86) PCT No.: PCT/SE2006/000869
§ 371 (c)(1),
(2), (4) Date: May 30, 2008

(87) PCT Pub. No.: WO2007/008159
PCT Pub. Date: Jan. 18, 2007

(65) Prior Publication Data
US 2008/0252412 A1    Oct. 16, 2008

Related U.S. Application Data

(60) Provisional application No. 60/697,564, filed on Jul. 11, 2005.

(51) Int. Cl.
*G05B 19/00*    (2006.01)
(52) U.S. Cl. .................. 340/5.2; 340/5.83; 340/426.11; 340/5.53
(58) Field of Classification Search .................. 340/5.1, 340/5.2, 5.21, 5.22, 5.23, 5.24, 5.25, 5.26, 340/5.52, 5.53, 5.54, 5.6, 5.64, 5.8, 5.81, 340/5.82, 5.83
See application file for complete search history.

(56) References Cited

U.S. PATENT DOCUMENTS

| | | | |
|---|---|---|---|
| 5,686,765 A | 11/1997 | Washington | |
| 6,225,890 B1 * | 5/2001 | Murphy | ................... 340/426.19 |
| 6,252,978 B1 | 6/2001 | Grantz | |
| 6,323,761 B1 | 11/2001 | Son | |

(Continued)

FOREIGN PATENT DOCUMENTS

DE    4326514 A1    2/1995

(Continued)

OTHER PUBLICATIONS

International Preliminary Report on Patentability for corresponding International Application PCT/SE2006/000869.

(Continued)

*Primary Examiner* — Nabil Syed
(74) *Attorney, Agent, or Firm* — WRB-IP LLP

(57) ABSTRACT

Method for assuring that the operator of a vehicle is an authorized driver, the method including utilizing an onboard, multi-mode driver identification system to ascertain whether an operator is an authorized driver. A first driver identification procedure is performed on a present operator of the vehicle and determining whether the present operator is an authorized or unauthorized driver of the vehicle. A second driver identification procedure is performed on the present operator of the vehicle and determining whether the present operator is an authorized or unauthorized driver of the vehicle, wherein the first and second driver identification procedures are performed with a time interval therebetween, the time interval being dependent upon the nature of the work being performed by the operator. A remedial measure is exercised to avert potentially negative impact when the present operator of the vehicle is determined to be an unauthorized driver based upon at least one of the performed identification procedures.

25 Claims, 18 Drawing Sheets

U.S. PATENT DOCUMENTS

| | | |
|---|---|---|
| 6,581,712 B1 | 6/2003 | Nathans |
| 2002/0048391 A1 | 4/2002 | Kim |
| 2004/0036574 A1* | 2/2004 | Bostrom .................. 340/5.82 |
| 2004/0078118 A1 | 4/2004 | Binder |
| 2004/0232229 A1 | 11/2004 | Gotfried et al. |

FOREIGN PATENT DOCUMENTS

| | | |
|---|---|---|
| DE | 10064469 A1 | 6/2002 |
| DE | 10119959 A1 | 10/2002 |
| DE | 10126050 A1 | 12/2002 |
| DE | 10154956 A1 | 5/2003 |
| DE | 10156731 A1 | 6/2003 |
| DE | 10156737 A1 | 1/2004 |
| EP | 1286297 A1 | 2/2003 |
| FR | 2820384 A1 | 8/2002 |
| WO | 03044632 A2 | 5/2003 |

OTHER PUBLICATIONS

International Search Report for corresponding International Application PCT/SE2006/000869.

European Search Report from corresponding European App. EP 11 00 5750.

European Search Report from corresponding European App. EP 11 00 5752.

* cited by examiner

| | | |
|---|---|---|
|  Ridge | Ridge | Defined as having double the distance from starting to ending, as neighboring ridges are wide |
|  Evading Ends | Evading Ends | Two ridges with different directions run parallel with each other for more than 3mm. |
|  Bifurcation | Bifurcation | A ridge splits, both ridges maintain the same direction and are longer than 3mm |
|  Hook | Hook | A ridge splits; one ridge is not longer than 3mm |
|  Fork | Fork | Two ridges are connected by a third ridge not longer than 3mm |
|  Dot | Dot | The ridge section is no longer than the neighboring ridges are wide |
|  Eye/Island | Eye | The ridge splits and rejoins within 3mm |
|  Eye/Island | Island | A ridge splits and joins again within not less than 3mm and not more than 6mm. The enclosed area is ridgeless. |
|  Enclosed Ridge | Enclosed Ridge | A ridge not longer than 6mm between two other ridges |
|  Enclosed Loop | Enclosed Loop | A non-pattern determining loop between two or more parallel ridges. |
|  Specialty | Specialties | Rare ridge forms such as question marks and butcher hooks |

Figure 3

| Strengths | Weaknesses | Opportunities | Threats |
|---|---|---|---|
| Inexpensive. | Not everyone can use this method. | Can be used while driving. | The sensor gets damaged by dirt etcetera. |
| Well-tested. | Can be deceived by molds. | Small equipment – can easily be integrated in the driver environment. | Some people might refuse to use it since the method is associated with identifying criminals. |
| Easy to use. | Might have problems with dirty or damaged hands. | With more than one template saved the system can randomly tell which finger to scan for verification. | If driver is out in the middle of nowhere and gets his fingerprints destroyed for instance by burning his hand. |
| Fast. | | Several models are available since many different companies manufacture the equipment. | |

Figure 20

| Strengths | Weaknesses | Opportunities | Threats |
|---|---|---|---|
| Very accurate | Expensive | Might be able to integrate with rear view mirrors. | People may refuse to have their eyes analyzed if they believe it is dangerous. |
| Fast | One company, Iridian, has all patents. All other manufacturers must have license from them. | Might be possible to use while driving. | Manufacturer discontinues business for some reason. |
| The iris does not change over time. | | | May be impossible to use in a vehicle due to lighting conditions. |
| Hard to deceive | | | |

Figure 21

| Strengths | Weaknesses | Opportunities | Threats |
|---|---|---|---|
| Fast, as long as it is verification. (And if you do not demand a long phrase to be spoken.) | Voice changes over time. | Can be integrated with cellular phone hands-free or other voice controlled equipment. | Drivers voice changes due to health and emotional conditions. |
| Inexpensive | Some people do not trust the technology. | System can randomly choose desired phrase to speak. | May be problems with the noisy environment in the coupé. |
| Easy to use | | Driver can have one, unique password, making the demand for other verification method unnecessary. | |
| Non-intrusive | | Can be used while driving. | |
| Spoken phrase can be changed if for instance stolen. | | | |

Figure 22

| Strengths | Weaknesses | Opportunities | Threats |
|---|---|---|---|
| Non-intrusive | Problems can occur with beards, sunglasses, make-up etcetera. | Camera might be integrated in rear view mirrors. | Lighting conditions in coupé might make it impossible to take a satisfying picture. |
| Inexpensive | A person's face changes over time. | Might be possible to use while driving. | Driver's face swells up or get bruised for some reason. |
| Easy to use | | | |

Figure 23

| Strengths | Weaknesses | Opportunities | Threats |
|---|---|---|---|
| Fast. | Expensive. | Camera might be integrated in rear view mirrors | New method, uncertain how much research and development will be done. |
| Independent of lighting conditions. | New and thus it is not extensively tested. | Can be used while driving. | |
| Hard to deceive. | | | |
| Non-intrusive | | | |

Figure 24

| Strengths | Weaknesses | Opportunities | Threats |
|---|---|---|---|
| Very accurate | Cannot be used while driving. | Uses laser, which means it is independent of coupé lighting conditions. | People may refuse to use the method since they may not trust the laser radiation. |
| Hard to deceive | Needs near perfect alignment of the eye. | | |
| Retina vessel pattern does not change much over time. | Expensive | | |
| Fast | | | |

Figure 25

| Strengths | Weaknesses | Opportunities | Threats |
|---|---|---|---|
| Non-intrusive | Must be used in conjunction with other means of verification. | Might be used while driving. | Uncertain how much research and development of the method will be done |
| Fast. | Only tested in a certain context. | Camera might be integrated in rear view mirrors. | Driver gets bruised in the area around the mouth for some reason. |
| Easy to use. | Uncertain how many companies, if any, that manufacture equipment. | Might be used in conjunction with for instance face or voice verification. | |

Figure 26

| Strengths | Weaknesses | Opportunities | Threats |
|---|---|---|---|
| Fast. | Ungainly equipment | Can be used while driving. | Only one manufacturer of equipment. |
| Works with (reasonably) dirty hands. | Hands are not unique, other means of verification needed. | | |
| Non-intrusive | | | |
| Easy to use | | | |
| Inexpensive | | | |

Figure 27

| Strengths | Weaknesses | Opportunities | Threats |
|---|---|---|---|
| Fast. | If someone finds out the password or the PIN, there is nothing stopping him or her from using it. | Most of the equipment needed is already in the vehicles today. | The password or PIN can be forgotten. |
| Easy to use, as long as you have a good memory. | Works best when used in conjunction with other methods. | Is not difficult to use while driving. | The password or PIN can be disclosed and used by others. |
| No big costs to integrate/use the method. | | | |
| | | | |

Figure 28

| Strengths | Weaknesses | Opportunities | Threats |
|---|---|---|---|
| Easy to use since it is a well-known method that most people have used before. | A card might be worn, or broken. | All the equipment needed is already in the vehicles today. | A card is easy to loose, or forget at home. |
| Fast. | A card can be used by several different persons. | The security can be increased by adding biometric data to the card, making it hard to use someone else's card. | The card might be stolen. |
| Non-intrusive | Works best when used in conjunction with other methods. | | Easier to deceive than for instance some biometric methods. |
| Inexpensive | | | |

Figure 29

| Strengths | Weaknesses | Opportunities | Threats |
|---|---|---|---|
| Very fast. | A RFID tag can be used by several different persons. | The equipment does not need much space, and would not be difficult to integrate in the vehicle. | A RFID tag is easy to loose, or forget at home. |
| Independent of lighting conditions. | Works best when used in conjunction with other methods. | Can be used while driving. | The RFID tag might be stolen. |
| Non-intrusive | | | |
| Easy to use. | | | |

Figure 30

Descriptive Statistics

| | N | Minimum | Maximum | Mean | Std. Deviation |
|---|---|---|---|---|---|
| Useful/Useless | 18 | ,00 | 2,00 | 1,2778 | ,82644 |
| Pleasant/Unpleasant | 18 | -2,00 | 2,00 | ,4444 | ,98352 |
| Bad/Good | 18 | -1,00 | 2,00 | ,8333 | 1,09813 |
| Nice/Annoying | 18 | -2,00 | 2,00 | ,3333 | 1,32842 |
| Effective/Superfluous | 18 | -2,00 | 2,00 | 1,0000 | 1,13759 |
| Irritating/Likeable | 18 | -2,00 | 2,00 | -,0556 | 1,21133 |
| Assisting/Worthless | 18 | -2,00 | 2,00 | ,7222 | 1,22741 |
| Undesirable/Desirable | 18 | -2,00 | 2,00 | ,2222 | 1,35280 |
| Raising Alertness/ Sleep-inducing | 18 | ,00 | 1,00 | ,1667 | ,38348 |
| Usefulness | 18 | -1,00 | 1,60 | ,8000 | ,72274 |
| Satisfaction | 18 | -2,00 | 1,50 | ,2361 | ,88895 |
| Valid N (listwise) | 18 | | | | |

Figure 31

METHOD FOR PERFORMING DRIVER IDENTITY VERIFICATION

The present application is a non-provisional application that claims benefit of U.S. Provisional Application No. 60/697,564, filed Jul. 11, 2005.

BACKGROUND AND SUMMARY

The invention relates to methods and an arrangement for performing driver identity verification.

The transport industry suffers from problems with smuggling and theft of valuable goods. Different security issues are a top subject around the world, especially since terror threats seem to intensify. One way to increase the level of security might be to have a verification system installed in commercial trucks, in order to assure that the driver is the proper one.

DE 43 26 514 A1 discloses an electronic anti-theft device for vehicles which gradually makes a motor vehicle with electronic engine control inoperative if a theft, robbery or attack takes place, if the driver cannot prove his use authorisation by keying in a personal identification number (PIN). The inquiry controlled by the electronic security system in order to prove identification takes place at suitable determined intervals in the travel time or along the route while the vehicle is being used. If the driver is not capable of proving his identity within a response time window, the speed of the vehicle is incrementally throttled till it comes to a standstill without endangering traffic by intervening in the electronic engine control and then as soon as it is stationary the vehicle is blocked against being driven away or towed away by intervening in the brake system, and further drive train electronic systems if they are present.

DE 101 56 731 A1 discloses a method and an apparatus for verification of authorized operators of a vehicle. Biometric data of the operator to be verified are determined before and/or during driving the vehicle and compared to reference data. If no match is found between the measured biometric data and the reference data, an autonomously operating control system takes over the control of the vehicle.

US 2004078118 A1 relates to a device for controlling an appliance, which cooperates with a human operator, wherein the appliance comprises an appliance-side safety device, which can interact with an enabling element provided with memory means and associated with a particular, authorized human operator, the appliance being operable only after interaction with the enabling element.

In one application the occurrences to be watched can be stored in the memory means of the enabling element, for example for watching motor vehicles with regard to unacceptably long driving times of a particular driver. In another application, the control means of aircraft are watched to ensure that the aircraft can be flown only by an authorized pilot. Invariable body characteristics of the driver or pilot, for example a finger print, are stored in the enabling element. The real body characteristics are detected by sensors and are compared with the stored ones. The vehicle or aircraft can only be used, if detected and stored body characteristics are identical.

U.S. Pat. No. 5,686,765 A provides a system for use with an automotive vehicle having a normally disabled ignition system. The system includes a reader, such as a fingerprint reader or retina reader, to identify the driver. The output from the reader is compared to corresponding physiological data stored in memory to determine if the driver is authorized to operate the vehicle. Optionally, a timer is employed to permit operation of the vehicle only during preset prescribed time periods.

It is desirable to provide flexible, easy-to-use, non-intrusive, imposture-safe methods and systems for truck driver verification. It is also desirable to provide similar verification and/or identification methods and systems.

An aspect of the application has two purposes. One is to find appropriate methods for driver verification and build a prototype of a verification system which can be used for testing and further development. The other is to study how truck drivers perceive such a system and how their conception goes along with the growing demand for higher security. The application focuses on the transport industry.

Eleven available verification methods were studied. To enable a well-based selection of methods to implement in a prototype, inquiries and interviews with truck drivers and haulage contractors were carried out to complement the theoretical study.

One regular and three biometric verification methods were chosen for a test; fingerprint verification, face recognition, voice recognition and PIN code. These methods were put together to a system that was implemented in a truck-driving simulator. A graphical user interface was developed in order to make the system user friendly. 18 truck drivers tested the verification system. They were thoroughly interviewed before and after the test in order to retrieve their background, expectations and opinions.

Most of the test participants were positive to the system. Even though they did not feel a need for it today they believed it to "be the future". However, some participants felt uncomfortable with the system since they felt controlled by it. It became clear how important it is to have a system that respects the users' privacy and to assure that the users are well informed about how the system is used. Some of the technology used for the verification system requires more development to fit in the automotive context, but it is considered to be possible to achieve a secure and robust system.

As will be described in greater detail hereinbelow, a number of inventions have been made in the course of the described research and analysis regarding driver verification systems.

In at least one embodiment, the invention takes the form of a method for assuring that the operator of a vehicle is an authorized driver. This is accomplished through the utilization of an onboard, multi-mode driver identification system used to ascertain whether an operator is an authorized driver. A first driver identification procedure is performed on the operator in the vehicle and it is determined whether or not he or she is an authorized or unauthorized driver of the vehicle. Normally the test will only be to confirm whether the person being evaluated is an authorized driver. If the identification procedure fails to confirm that he or she is authorized, it will be assumed and acted upon as if it has been confirmed that they are unauthorized. Regardless of the outcome of the first identification procedure, a second driver identification procedure is subsequently performed on the operator and it is again attempted to determine whether he or she is an authorized or unauthorized driver. The first and second driver identification procedures are performed with a time interval therebetween, and this time interval is dependent upon the nature of the work being performed by the operator. As an example, the interval between identification confirmations will be different for urban delivery drivers making frequent stops and entrances/exits to and from the vehicle as compared to long-haul drivers making only a few stops during the day and presenting far fewer opportunities for unauthorized operators to slip behind the wheel of the vehicle. Finally, remedial (remedying) measures will be exercised in order to avert potentially negative impact when the present operator of the vehicle is determined to be an unauthorized driver based upon at least one of the performed identification procedures. While the truck will normally not be brought to an immediate stop based on a failure to ID the operator as an authorized driver, such things as notifications to the home office may be telematically affected or the vehicle prevented from restarting after the next driver-made stop.

It is contemplated that the driver identification procedures can be different from one another, or alike.

The second driver identification may be initiated immediately following a determination that the operator is an unauthorized driver in the first driver identification procedure.

Alternatively, the second driver identification procedure may be performed only when it cannot be determined that the operator is an authorized driver based on performance of the first driver identification procedure.

In at least one embodiment, one of the identification procedures is a passive identification test that does not require conscious interaction by the operator in association with the performance of the driver identification procedures. In one example, the passive identification test comprises a scan of a physical characteristic of the operator from which an image is compared to a set of control images representative of authorized drivers of the vehicle.

At least one of the first and second driver identification procedures is an active identification test that requires conscious interaction by the operator in association with the performance of the at least one of the driver identification procedures. An example would be the placement of a finger or hand on a scanner. Alternatively, the active identification test can include issuing a request to the operator to input a personal identification number into the system identifying the operator as an authorized driver. Another form of an active identification test comprises reading hard-coded identification information on an identification card presented by the operator. The system then may request that the operator input a personal identification number into the system that corresponds to a hard-coded identification number read from the identification card. Similarly, the active identification test can comprise issuing a command to the operator to speak a prescribed phrase, recording the spoken phrase as a speech pattern and comparing that pattern to a set of control speech patterns of authorized drivers of the vehicle.

In one variant or development of the invention, the first and second identification procedures are of two different types from one another and they are performed with random time intervals therebetween.

In another inventive aspect, an automated verification system is disclosed that appreciates that one of the issues human factors experts struggle with in this area is when and how should a driver be verified. Since the use of commercial vehicles differs depending on the application, some drivers might leave and enter their vehicle twenty times a day while some driver do the same only two to three times per day. In order to maintain a high enough security level without the system becoming annoying to the driver, several different strategies can be used. One of them is to perform automatic verification while driving. For instance, a face recognition (verification) can be performed during driving, without the driver being aware of it. If it fails the driver can be prompted to input his PIN-code or to use another method. The verification can be performed with random intervals.

In still another inventive aspect, a vehicle is equipped with several verification methods the driver can be prompted with different methods at different times. If the choice of method and time is randomized the driver will have no way of knowing when or how to verify himself. Implementing this kind of unpredictability in the system increases the security level since an imposture would never know when or in which way he would have to verify himself.

In yet another inventive aspect, it is appreciated that in biometric systems it is not the measured biometric (image) itself that is verified (matched), but rather a template of the biometric; that is, a template is extracted from the measured biometric and compared to an existing template in the database. One of the problems with matching against a stored template (or the biometric measure itself) is the fact that a person's biometrics might change over time while the stored template does not. For instance, a person's fingerprint might change due to a scar or a spoken password due to illness or age. One solution to this problem is to update the template (manually or automatically). An automatic update can be achieved in a multi-modal verification system; that is, a verification system using more than one biometric/PIN-code/ smart card. One or more verification methods can then be used to verify the driver while one of the methods not used updates its template (if the verification process was a success). By way of example, the driver enters his vehicle and is prompted to verify himself using PIN-code, fingerprint and face recognition. The system verifies him using PIN-code and face recognition and uses the fingerprint biometric to update the fingerprint template in the database.

In a related aspect regarding the stored biometrics template, a crucial issue is where to store the template. Basically there are three alternatives: (i) a database in the truck; (ii) a database in the back-office (requires real-time communication between the vehicle and the back-office; and/or (interconnection) a database that the driver carries with him such as a smart card. On option is to use the digital Tachograph driver's card to store verification templates. The card is a smart card and thus suitable for this kind storage, but more importantly, it is something that the driver is enforced to use by law (at least in Europe) and is thus always carried with the driver.

In another inventive aspect, redundancy is instituted in appreciation of the uncertainty typically related to known identification verification systems. The performance of a face recognition method might for example be affected by lighting conditions. Using several methods (e.g. face recognition and PIN-code), redundancy is achieved in the system. For example, a driver is driving down the road and a scheduled automatic facial recognition is performed and it fails for some reason (lighting conditions may be bad or the like). The driver is then asked to verify himself using fingerprint and PIN-code.

Finally, it should be appreciated that each of the aspects described above, either alone or in combination, can be implemented in a telematics context. That is, the verification system can report/receive information and the like to/from a back-office or a security network on a company/national/ international level. As an example, ex-convicts can be prevented from driving hazardous goods by verifying their detected biometric data against a national/international database on criminals.

BRIEF DESCRIPTION OF THE DRAWINGS

The present invention together with the above-mentioned and other objects and advantages may best be understood from the following detailed description of the embodiments wherein is shown schematically:

FIG. 3 several types of distinct features of a fingerprint to analyze, for example loops, arcs and whorls;

FIG. 20 a table concerning fingerprints as method of verification;

FIG. 21 a table concerning iris scanning as method of verification;

FIG. 22 a table concerning voice verification as method of verification;

FIG. 23 a table concerning face recognition as method of verification;

FIG. 24 a table concerning facial thermography as method of verification;

FIG. 25 a table concerning retinal scanning as method of verification;

FIG. 26 a table concerning lip movement scanning as method of verification;

FIG. 27 a table concerning hand geometry recognition as method of verification;

FIG. 28 a table concerning passwords and PIN's scanning as method of verification;

FIG. 29 a table concerning cards as method of verification;

FIG. 30 a table concerning RFID as method of verification; and

FIG. 31 a table concerning statistics from van der Laans Acceptance Scale.

DETAILED DESCRIPTION

Figure 1:
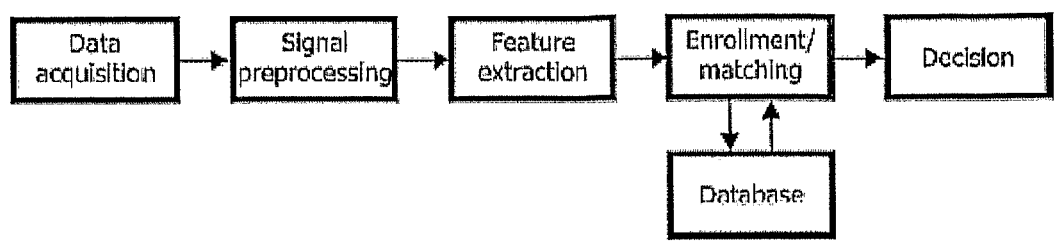
FIG. 1 steps to enroll/match users in most common verification methods.

Security issues are given high priority around the world. This has also affected the automotive industry, which has raised the question whether it would be possible to increase the security by implementing a driver verification system in commercial vehicles. Questions that will be explored herein are for instance which type of verification to use and whom such a system would benefit. This section contains a background, a purpose and the restrictions to the present application. To give an overview of the application this section is concluded with a reading guide.

Due to the growing terrorism threats, vast investments in research and development are made in order to increase security in the society. The Department of Homeland Security (US) is an example of this effort. No matter how it is presented, security is a topic that has become more and more important, especially after the terror attack against World Trade Center in 2001. Many changes in legislation have already been done, especially in the US. For instance there is a legislation proposal that all trucks carrying hazardous goods must have a biometric driver verification system. This since the US government wants to prevent that criminals (in FBI's registers) drive hazardous goods. The demands for a flexible, secure and reliable verification system are therefore high, since there are about 8 million professional truck drivers in the USA. The EU (European Union) along with other associations and countries has also made large investments in security research and crisis management.

One example of the increasing security demands is that several airports, for instance Amsterdam Airport Schiphol and the airport in Umeå Sweden, have tested the use of biometric verification of their passengers. After a pilot year in 2001, an automatic border passage system, using iris recognition, is now permanent at Amsterdam Airport Schiphol.

To keep up with the demands from the market and the changes in legislation, new products often have more advanced security systems than the previous ones, using more advanced identification and verification techniques. One example is notebooks with embedded fingerprint scanners.

Smuggling, terrorist attacks and theft of valuable goods are scenarios that usually involve stolen vehicles. The transport industry is thus a natural segment to focus on to improve the public security. One central view when enhancing transport safety and security is to verify that the driver is who he claims to be.

This invention combines two different competences and results in a test of possible techniques that might be suitable for driver verification, but also in an evaluation of the drivers' opinions of the system. Interviews and inquiries will map the drivers' opinions before and after testing a prototype. A comparison between what security means to the interested party/the manufacturers and how it goes along with the drivers' conception of usability, safety and privacy will also be performed.

Benefits of a Driver Verification System

Trucks are used for various purposes. Thus a flexible system, which can fit in sundry situations, is required. Therefore many different challenges arise when it comes to design such a system. It is desirable to meet as many demands as possible, even though it is impossible to build an all-purpose system. A few various situations when a driver verification system could be beneficial are illustrated below.

In South America there are major problems with stolen vehicles. This has lead to a common procedure that, when transporting valuable goods, the driver calls the insurance company every ten minutes to assure that everything is all right. If a vehicle is equipped with a verification system, the system could continuously assure the insurance company that the vehicle was driven by the proper driver, thus allowing the driver to focus on his driving.

A verification system could allow a haulage contractor to make sure that the driver is not previously sentenced for traffic related misdemeanor. To store the information about the drivers a database would be required. If that database were connected to the authorities, a file check could be done almost in real-time.

A haulage contractor who has both driver verification and a vehicle mounted alcohol interlock device could receive a "trusted driver mark". Customers would then be assured that their goods are transported by a "trusted" driver. Cooperation with the national road association and the insurance companies might result in reduced vehicle insurance costs.

A bonus for the use of a verification system could be that, trusted, verified drivers could be privileged to pass weighing stations or road tolls. This would ease the job for the drivers and make transporting more efficient.

A verification that associates the recorded parameters to a specific driver could control whether somebody drives for longer than the legislated 4.5 hours (European legislation) without a break. In that case a warning could be sent to the driver as well as to the haulage contractor.

In Sweden, dismissed cases have occurred due to the fact that the prosecuted have blamed each other. In case of accident or crime, a verification system could assure the investigators who actually drove the vehicle at that specific time.

If a vehicle is stolen and there is a demand for verification the impostor will not get far before the system reveals the theft. This vouches for faster measures if the vehicle has been exposed to crime The Swedish customs has a process called "Servicetrappan" (the service stair) in order to simplify the customs procedure for trusted companies. The process comprises a number of ranking steps. The higher ranking the company, the smoother passage through customs. A driver verification system could be a part of this process, offering haulage contractors with verified and trusted drivers a higher rank and thus more efficient customs clearance.

Furthermore, if there was a verification system in the truck, the driver could benefit from it, as it would be possible to automatically adjust the settings in the driver environment according to the driver's personal preferences. As example, settings for driver seat, climate control and stereo could be automatically adjusted. This is however beyond focus of this application.

There are two main purposes with this application. One is to find appropriate methods for driver verification and build a prototype of a verification system which can be used for testing and further development. The other purpose is to study how the drivers perceive such a system and how their conception goes along with the growing demand for higher security.

These two purposes can be summarized to: "To study the possibilities to use available verification methods to design a flexible, easy-to-use, non-intrusive, imposture-safe system for truck driver verification."

Although the verification methods described herein can be used in almost any type of vehicle, the focus for this application will be commercial trucks and the transport industry.

Three biometric methods will be implemented and tested in the prototype. The method selection will mainly rely on the theory that has been read during the work, but price and delivery time may also affect the decisions.

A GUI was developed to facilitate the communication between the verification system and the user. However, no theory about user ability and design will be mentioned since the author who developed the GUI already possessed this knowledge beforehand. Besides it is the system, not the GUI that is in focus for the application.

A verification system in a vehicle opens up many possibilities to enhance security. Some of the questions that will be looked upon are which type of verification to use and whom such a system would benefit. However, the security issue is not the only issue to consider when constructing such a verification system. The driver's privacy and conceptions of safety should also be taken into account. These different views lead to separate approaches to the problem, the various perspectives of security, safety and privacy are therefore explained here. This is also to clarify what these terms stand for here and to show why they are important for this application.

Security

There are different types of security, such as personal, company, public and country security. All these aspects make it hard to give one single definition. A commonly accepted conception though, is that security is qualities or measures taken to reduce the probability for unwanted incidents to happen.

The security issues within this thesis include all the applications mentioned above. Public security and country security are issues to consider when regarding the risks for terror attacks. The risks in conjunction with transportation of hazardous goods also affect public security. The risk for stolen vehicles addresses company security. Finally, personal security is addressed by the risks, as well as the benefits, that might come with the implementation of a driver verification system. These various issues will be discussed later herein.

Privacy

The main purpose with a verification system is to increase the level of security. One way to do that is to use biometric methods. The problem is that they themselves are a threat, as they might intrude upon a person's privacy. Hence the user's privacy is another issue that will be considered herein.

Privacy can be described as the right to have a personal sphere to protect one's individuality and to be able to keep some things to oneself, without any insight from public authorities, employers or others. Biometric methods can give the feeling of the overall watching "Big Brother" (as in "1984" by George Orwell). If so, the methods might be perceived as if they are violating a person's privacy.

Safety

Security and safety are not quite the same even though they are closely related. Safety can be defined as when, or where, a person can do something, without being afraid that something undue is going to happen. Good security can thus result in perceived safety.

Even though all methods are safe to use, a person might not want to use them if he perceives it as intrusive or if he thinks they might harm him in any way. The user's conception of a system must consequently be considered, because no matter how safe a method is; a person who does not trust it will not use it. It makes no difference whether the driver has used a method or not, he will always have opinions about it. However, their conception is not always in accordance with facts and reality. Iris scanning, for instance, is considered one of the most accurate methods and also a safe method to use, but many people do not like the idea of using a system that scans the eye. A person who is afraid that scanning might damaged the eyes will not perceive such a system as safe.

Things that are unknown do often frighten people, information is thus important since knowledge might diminish negative feelings. As previously stated people tend to believe that iris scanning is an uncomfortable verification method, but a test carried out by SAS proved differently. They evaluated two different verification systems at timed airport; fingerprint and iris scanning. Frequent passengers participated in the test and used fingerprint verification half of the time and iris scanning half of the time. The greater part of the participants was positive to the use of biometrics (78% thought that SAS should introduce biometric verification of the passengers) and in this case the iris scanning was graded slightly higher than fingerprint verification. This means that the users have to be convinced that the system is a benefit for them and their work; otherwise they will not agree to use it.

Verifying the Vehicle's Appropriate Driver

There are many different verification methods on today's market, some of them already in use, others soon to come. Despite of that, there is no verification today of who is actually driving a vehicle. The intention with this is to introduce some of the various methods for verification and list their advantages and disadvantages, from both an automotive as well as a user perspective. The section includes an introduction to biometrics and descriptions of different biometric methods. PINs (Personal Identification Numbers), passwords and various types of cards are also methods for verification. Since they are used frequently today, they are assumed to be well known to the reader and are only mentioned briefly herein.

One general advantage for all these methods is that the user has to pause his present task in order to carry out the verification. This increases his risk awareness and might influence him to be more attentive and careful.

An Introduction to Biometric Methods

The word biometry has its origin in Latin and can be translated into "measuring life". Biometry usually refers to statistical studies of the characteristics, of living organisms, that can be measured. Biometrics on the other hand, is rather used for analysis to identify humans by measuring their characteristics. Biometric methods have been used for identification and verification purposes since the late 19th century. When referred to biometric verification/identification methods in this application, it means methods that analyze one or more of a person's unique body characteristics, such as hands, face or eyes.

The most appropriate verification method varies depending on where and for what reason, it will be used. However there are three fundamental demands one should endeavor to fulfill when deciding which method to use. To achieve the ideal method for verification the feature to be measured should be unique, that means something characteristic for that individual; permanent, which means it should not change over time and finally it should also be universal, which means everybody should have it. The acceptability as well as the accessibility of the characteristics analyzed by a method should also be considered. A biometric feature is acceptable if it is not perceived as intrusive by the user to measure it. If a characteristic is easy to present to a sensor, that characteristic is referred to as accessible.

Basically there are three ways for a person to identify himself; to have something, an access card for example; to know something, for example a password or a PIN; to be someone, using biometric methods for identification.

Most of the different methods described herein can be used for both verification and identification, but the distinction between the two terms, should be observed.

| | |
|---|---|
| Identification | When a method is used to find out who a person in a large group is, it is called identification. This is sometimes referred to as "one to many comparison". It means searching through the large group to find one individual who matches the feature that is used for the identification. |
| Verification | When a method is used to analyze whether a person is who he claims to be, it is called verification. This is sometimes referred to as "one to one comparison". In this case it is only necessary to compare the feature of a person against the data that has been saved in that person's name. |

This application will focus on verification since the driver is supposed to be known to the company. The system is thus only used to verify that it is really the expected driver who is behind the steering wheel.

There are a number of advantages that makes the use of biometric methods for verification worth to consider; biometric characteristics cannot be forgotten; physical attributes cannot be misplaced; physical attributes are harder to fake than identity cards; fingerprint patterns and other biometric characteristics cannot be guessed or revealed as easily as for instance a password.

One problem with biometric security systems is the extent of the damage it can cause in case somebody actually manages to steal the identity information. If a person looses a credit card, or if someone else finds out the secret PIN to turn off the burglar alarm, it is always possible to get a new card, or change the code. However, if a person's fingerprints are copied it is impossible to get new ones. The person would no longer be able to use the prints for verification since there would always be a risk that someone else claims to be him.

In case of theft it is important to update concerned databases and register stolen identity items so that a possible impostor cannot use them. One of the hijackers on the 11 Sep. 2001 used a passport that was stolen from a Saudi, in the USA, five years earlier. With an updated database this could maybe have been avoided. If the passengers back in 2001 also would have had needed to identify themselves biometrically, it would have been more difficult for the terrorists to succeed with their mission. Still, biometric verification methods are no perfect solution. An impostor can attack the database, or the connection between the database and the scanner, in order to bypass or manipulate the system. Thus, even if the aim is to find a solution secure enough, it is impossible to fully eliminate all risks.

The Verification Process

This section will give an overview of the most common verification methods. Most of them use the following steps to enroll/match users according to FIG. 1:

| | |
|---|---|
| Data Acquisition | The sensor scans the subject |
| Signal Pre-processing | For instance removing environment noise in a voice recognition system. |
| Feature Extraction | Analyzing the different characteristics and creating a template based on a subset of the acquired data. |
| Enrollment/ matching | Either adding the template to the database (enrollment) or comparing it with templates already in the database (matching). |
| Decision | A successful matching authorizes the subject, a failure rejects authorization. |

Templates are mainly made for two reasons. One is to reduce the amount of stored data and the other is to reduce the complexity of the following matching phase. Another benefit with templates is, if for instance using a fingerprint scanner, the entire picture of the print is not stored, merely a template of unique characteristics. This makes it difficult to use the template to reproduce the print.

Vitality Detection

An impostor might try to use a fraud or remove the finger from an authorized user to pass a fingerprint scanner. The same goes for iris scanning and hand geometry. Some voice recognition systems might be deceived by a tape recorder and a face recognition system by a photograph of an authorized user. However there are measures to avoid this. A biometric verification system can be equipped with vitality detection to assure that the retrieved sample is from a human being. The vitality detection has to suit the verification method. How vitality detection can be implemented for each method is thus presented herein Biometric Methods for Verification The basic procedure for verification systems has been explained above in this section. Descriptions of several different biometric verification methods: their history, how they work, their advantages and disadvantages, will be presented here.

Fingerprint Verification

Figure 2:
FIG. 2 a fingerprint with ridges and valleys forming a pattern, which is characterized by irregular and incoherent lines.

Fingerprints are probably the most well-known and widespread biometric identification method. During the end of the 19th century and the beginning of the 20th century several different types of identification methods were developed. Normally these methods do some kind of overarching classification regarding a few main patterns. Looking at the fingerprint, the ridges and valleys form a pattern, which is characterized by irregular and incoherent lines. The scanners of today are very fast and accurate and the method is starting to become accepted for everyday use. (See FIG. 2)

Comparing the entire print takes a lot of processing power and therefore scanners usually focus on special features, for instance where ridges end or split in two. These features are called minutiae. The scanners use complex algorithms to find and analyze the minutiae in order to make the comparison. The basic idea is to measure the relative positions of the minutiae, in the same way that a part of the sky is recognized by the relative positions of the stars. There are several types of distinct features of the print to analyze, for example loops, arcs and whorls. (See FIG. 3)

The automatic search systems of today are usually done using data algorithms to classify and compare a fresh template, encoded from the scanned fingerprint, with a stored collection of templates.

The fingerprint scanners are mostly optical or capacitive even though other technologies exist: such as radio frequency (RF), ultrasound or silicon scanners.

An optical scanner is basically a small digital camera, which usually takes an inverted picture of the fingerprint, making the ridges darker on the picture. Before comparing the image, the scanner processor performs a series of tests to determine whether the image is good enough. If the picture is too dark or too bright, the scanner automatically changes exposure time to let in more or less light before it takes a new image.

Figure 4:
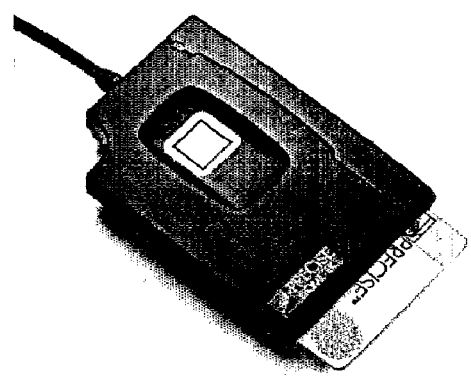
FIG. 4 a capacitive scanner for scanning a finger.

A capacitive scanner uses an array of small plates, each smaller than the width of a ridge and connected to an inverting amplifier. When the finger is placed on the scanner the finger and the plates form a simple capacitor. A reference charge is sent out to the plates, causing the capacitors to charge up. Depending on the distance between the plates and the finger, (if it is a ridge or a valley), the corresponding amplifier will present a different voltage. These voltages form the "image" of the fingerprint. This makes it harder to use a simple paper, with a black and white image of the print, to deceive the capacitive scanner. Furthermore, the capacitive scanners can be made smaller than the optical ones. (See FIG. 4)

Figure 5:
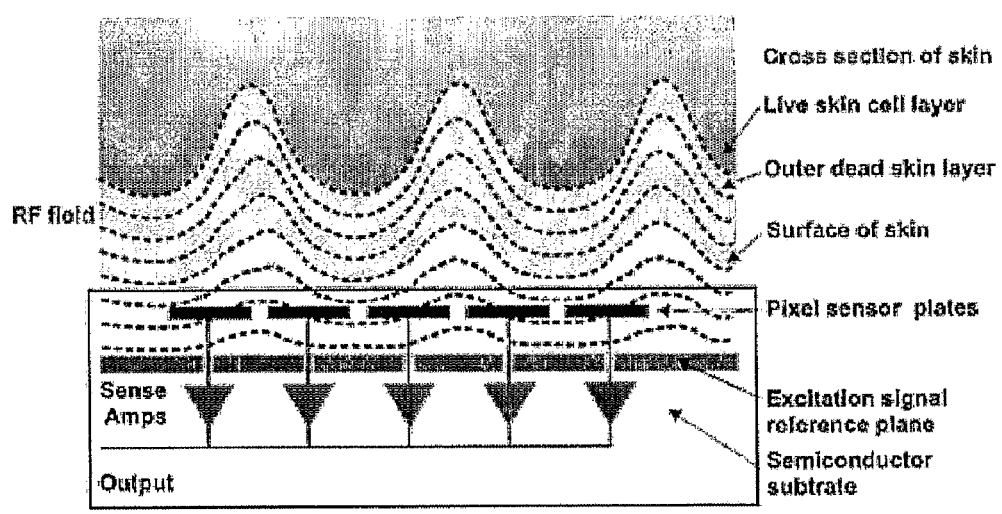
FIG. 5 an RF-method for scanning the print below the actual surface of the fingertip.

A recently developed fingerprint scanning technology is RF scanning which uses a low-energy radio signal to scan the print. RF has the advantage that it scans the print below the actual surface of the fingertip and is hence less sensitive to dirt, damages and defects. (See FIG. 5)

Another distinction to make when discussing scanners is the one between sweep and area scanner. On a sweep scanner the finger is dragged past the sensor, while on an area scanner the finger is placed on the sensor and held there until the scan is completed. Most scanners of today are area sensors but the model has some drawbacks. The sensor becomes dirty. This does not only affect the scanning performance; some people may have aversions against placing their fingers on a dirty sensor. Problems with latent prints exist. This means that the previously scanned print remains on the sensor surface and becomes reactivated during the scanning of the second fingerprint.

The subject may place the finger askew on the sensor. Most scanners do not tolerate a larger rotational angle than 20-30 degrees.

Sensors (particularly capacitive sensors) cost per area unit. The sensor area on a sweep scanner can be made smaller and hence less expensive.

The sweep scanner is not a perfect solution either. The major issues are that it usually takes some time to acquire a correct sweeping technique and that the slices must be reconstructed to a fingerprint, which can be time consuming. There are thus many different parameters to be considered when choosing a scanner for specific circumstances. Which sensor technique to use is therefore an important issue.

An optical scanner can be deceived by a picture of the print, a capacitive scanner by a mold. A mold can be made of gelatin, silicone or even play-doh. To create a mold, the actual finger is required. But to obtain a picture that might defraud an optical scanner, it is enough to have something that a person has touched, like a glass, to create an image of that person's fingerprint. Hence, the optical scanner is easier to deceive. There are numerous other methods to deceive the system, like flashing lights, heat, moist or various powders. However, these methods for deceiving the system are useless if the scanner is equipped with so called vitality detection.

Vitality detection can be carried out in a number of ways; by analyzing temperature, pulse, blood flow, pulse oximetry, electric resistance, EGG, relative dielectric permittivity, pore or skin deformations, or combinations of these. Vitality detection methods are more or less easy to get around. A major problem is for the scanner to determine whether the scanned print is a part of the finger, a leaf thin image, or a mold attached to the fingertip. A new method using perspiration might be the solution, but it is yet under development and therefore it is not possible to tell how well it really works.

All ten fingers have unique prints, which make it possible to use any finger for verification. Identical twins might have similar fingerprints, but not identical, since even twins have their own unique fingerprints. It is said that a person leaves at least twenty-five perfect fingerprints behind every day and one major problem with fingerprints is that they are quite easy to copy.

Most people initially put their finger in an incorrect position on the scanner, as they assume their fingerprints to be on the tip of the fingers, when in fact the finger must be placed a bit lower to give an image that can be processed for verification. Some scanners are designed to facilitate the right positioning of the finger, using for instance guidance pegs or depressions.

It should be noted that not all people can use this method; as a matter of fact, as many as 5% have fingerprints that cannot be read by fingerprint scanners. Scars, calluses or other defects affect the result and people may have so thin or damaged ridges and valleys that the scanners resolution is not good enough. Moreover, even though most people see this method as non-intrusive, some have aversions against fingerprint scanning, due to the forensic associations that can be made.

Even though every finger is said to have a unique fingerprint, two of the main patterns are detected in 98% of all observations, a fact that increases the risk to be mistaken. Today the traditional visual examination has been replaced by automation. There have been mistakes when it comes to identify a person from out of only having the fingerprint. But when it comes to verify a person's identity in a delimitated database, it is a very reliable method.

Iris Scanning

The principle for this method was formulated in 1936; still it was not applied until the 1990s'. All commercial iris biometrics that exists today derives from algorithms made by Professor John Daugman in 1994.

Figure 6:
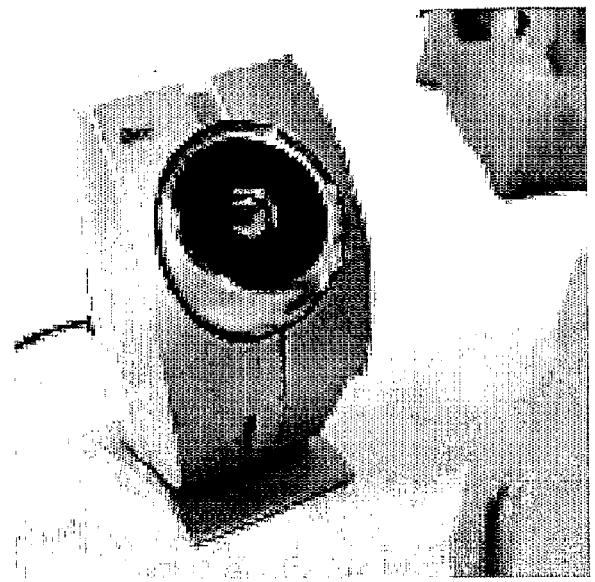
FIG. 6 an iris scanner.

An iris scanner takes a picture of the eye using a regular digital camera. The image is usually about 120 pixels in radius and the result is usually an 8-bit image of one iris. When the picture is acquired, the first step in the template creation process is to locate the pupil and the iris. After that, the ring that occurs when the pupil is cut out from the image is transformed to a disc using a polar transformation. The analyzing program then uses a number of algorithms to create a template based on the different characteristics. (See FIG. 6)

Vitality detection can be implemented by letting in visible light in the eye and detect whether the size of the pupil changes or not. That requires either a quite powerful light source, or that the person stands very close to the scanner. This vitality detection will therefore not be further discussed since it would not be suitable in a truck and therefore is out of the focus for this application.

Figure 7:
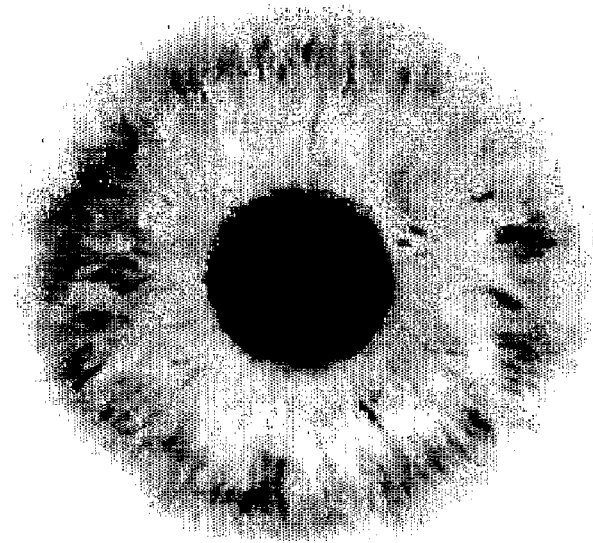
FIG. 7 a scanned iris.

There are more than 266 independent characteristics in the iris. The iris is unique not just for every person, but also for every eye. Usually about 170 of the 266 characteristics are used to form the template for comparison. Other biometric verification methods only use about 15 to at the most 35 independent significant characteristics for the analysis. Thus, as there are so many characteristics in the iris template the method is very reliable for verification. Physical characteristics like our facial looks and our voice change over time, but the iris is, disregarded some color fluctuations in young years, invariant over our entire lifetime. This is a great advantage, since the time-consuming update of the database will not be required. (See FIG. 7)

A proof of the methods reliability is the United Arab Emirate's iris recognition system to prevent expelled foreigners from re-entering the country. About 600 people are being scanned every day and today the database comprises over 355,000 irises. Over 1.6 million searches have been made so far and not a single false match has been detected. Statistical analysis of the program suggests the probability of a false match is less than 1 to 80 billion.

The enrollment rate is very good; all irises can be analyzed, except for those of some visually impaired people. Besides, there are applications that automatically capture an image of the iris from distances up to three feet, hence making the process less intrusive.

Some systems however, have problems scanning people with very dark eyes. Moreover colored or bifocal lenses can be problematic, as well as strong glasses.

One drawback with iris scanning is that all equipment is manufactured on license from Iridian Technologies Inc. This license makes the equipment and thus the whole method, expensive. In addition, if the method were to be implemented in a vehicle, the various lighting conditions would presumably cause problems. If the coupe is too dark a proper scanning would be impossible, ditto if direct sunlight is let into the camera. The sunlight problem could be solved if the camera was mounted in the rear view mirror, protecting it from direct sunlight. This might also increase the possibilities to use the scanner while driving, since the driver should look into the mirror regularly. However, this solution is more suitable for passenger cars, as trucks do not have rear view mirrors inside the coupe. This solution is therefore not applicable within the boundaries of this application.

Voice Recognition

This method identifies people based on the differences in their voices. The subject speaks a pre-defined phrase into a microphone; the system captures the voice sample and creates a template based on for instance pitch, cadence and/or tone. The procedure is the same for the verification. The subject says the pre-defined phrase in the microphone and the system extracts a template to compare with the stored templates in the database. One advantage with using voice recognition is that it is hard to deceive without having high-end recording/play-back equipment. This since the voice verification system can use a microphone that captures frequencies not recordable with for instance a dictaphone. Even if the password would be recorded satisfactory to deceive the system, the spoken phrase could be altered making the unauthorized copy useless. Furthermore a sophisticated playback system would be required in order to reproduce all frequencies in a proper way. The demand for high-end equipment can be seen as a type of vitality detection.

A disadvantage with voice recognition is that voice templates take more storage place than other sorts of biometric information. Consequently the voice verification might take longer time than other methods due to the larger amount of data to analyze. This can be annoying for the user, as he would have to wait for the verification. Another problem is that health, emotional state, fatigue and aging are factors that affect a person's voice characteristics. Thus voice verification should not be relied on as the only method for authorization.

Face Recognition

A method, which has recently regained attention, is face recognition. Alphonse Bertillon at the Paris police formulated the first model for visual identification in 1883. His system was called anthropometry and was founded upon several complicated anatomic measurements of the size of the head, the length of a finger, the height of the face and special features like the color of the eyes, scars and the color of the hair. This method was not reliable and was soon replaced by fingerprints. Tests with surveillance cameras have recently been carried out in Great Britain in order to identify criminals. Those tests have shown that it is very difficult to identify people this way, especially if the camera does not get a clear shot; or if the person has altered his/her attributes with for instance a beard or glasses. Despite the lack of reliable results for identification the method works satisfactory for verification purposes.

The principle is simple and similar to the analysis used for the previously described verification methods. An image of the subject's face is taken and analyzed with a computer to find prominent characteristics such as the outlines of the eye sockets or corners of the mouth. The results from the analysis are stored in a template. When trying to verify a person an image is taken and a template is created based on the new image. The new template is matched against the one stored in the database. A standard PC of today can compare a template with thousands of templates in a database in less than one second.

There are various techniques to extract significant features from the image, such as Gabor filtering or eigenfaces. These techniques are fairly complicated and since it is not essential for the purpose of this application to describe them in detail, the interested reader is directed to references known in the art for further information.

One advantage with face recognition is that people tend to find this method comfortable since it studies a person's face, which is the same way as we humans do when identifying each other. To achieve more accurate results face recognition can be used in conjunction with for example lip movement and voice recognition. Research has been done, trying to enhance the algorithms for face verification to achieve robustness against aging, lighting conditions or facial expression.

Today however, there is no absolute solution and the database would need to be updated continuously.

One important decision to make when considering face recognition is which type of camera to choose; an ordinary digital camera or an infrared? When the camera uses infrared the method is called Facial thermography (see the following section).

Facial Thermography

Figure 8:
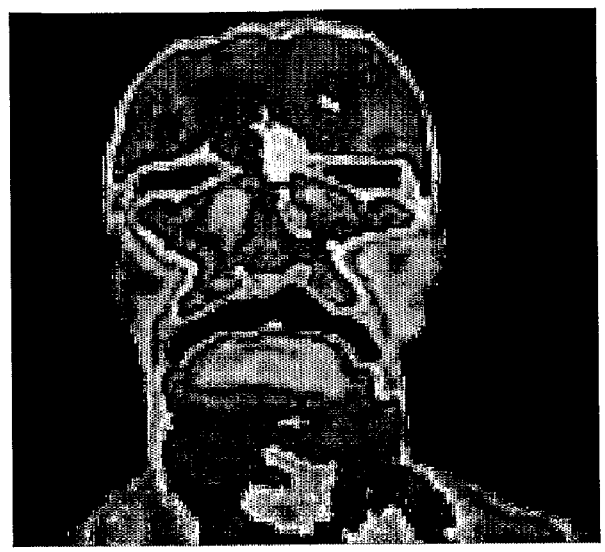
FIG. 8 a facial thermography for face recognition, with the use of an infrared camera a heat pattern, founded on a person's facial blood vessel pattern being unique for each person.

Facial thermography is a special kind of face recognition. With the use of an infrared camera a heat pattern, founded on a person's facial blood vessel pattern, can be seen. This pattern is unique for each person and is hard to forge. (See FIG. 8)

An infrared camera works approximately the same way as an ordinary camera, the difference is that it is sensitive for infrared light which is electromagnetic radiation in the interval of roughly 760 nm-0.5 mm. This makes infrared light invisible to the human eye. Note that visible light also is a form of electromagnetic radiation, but of a different wavelength than infrared light. Infrared light is sometimes referred to as heat radiation and is sent out by all objects with a temperature above absolute zero. Thus, the camera shoots a temperature image of the object. Since different parts of the face have different temperature due to the shape of the face and variations in blood flow, this can be used for verification.

Even though facial thermography analyses a person's facial heat pattern, it does not make any significant difference if the subject has been resting, exercising or out in the cold. Studies show that IR-cameras are fairly insensitive to these circumstances. Another advantage is that the scanning is independent of visual light conditions since the camera operates in the infrared wavelength interval and therefore is "blind" to visible light.

Comparisons between using regular cameras versus IR-cameras for facial verification have been done, most often beneficial for the IR-cameras since they are independent of the lighting conditions. However, one problem with the IR-cameras is that glasses of all types are completely opaque to them. This means that the area around the eyes can cause problems if a person wears glasses, or if the person usually wears glasses and takes them off without updating of the database.

Retinal Scan

Figure 9:
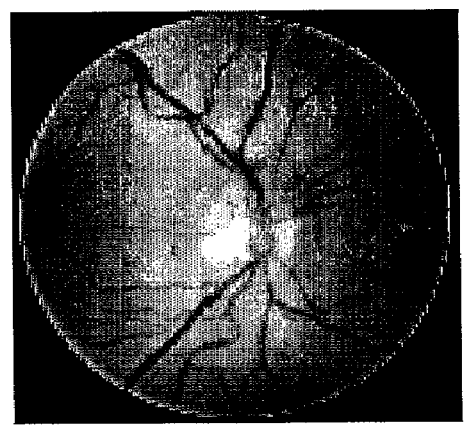
FIG. 9 a picture of a retina for retina recognition.

Retinal recognition was formulated in the 1930s, but it was not until the 1980s the technology was developed enough to make the method commercially viable. Retinal scanning is a fast and very exact method which uses laser to analyze the blood vessel pattern of the retina. When the picture of the retina is taken, the system usually stores a template based on the characteristics extracted from the image, similarly with previously mentioned methods. (See FIG. 9)

Figure 10:
FIG. 10 imaging the retina.

Retinal scanning is considered the most accurate biometric verification method since the vessel pattern is unique for every person and does not change over time. The retinal vasculature disappears within seconds if the subject ceases to live, hence insuring that the captured image was obtained from a living human being. A study showed that, even though the retina is not easy to scan, the time needed to imaging the retina was less than the time required for imaging of a fingerprint. (See FIG. 10)

The camera must have high resolution and the method demands accurate alignment of the eye to be able to scan. Image caption can be done from a distance up to three feet. It is, however, uncertain under which environmental conditions these qualities are valid.

Lip Movement Recognition

The way people move their lips while speaking differs from person to person, therefore a method for lip movement recognition has been developed. While a person speaks a camera is used to take a number of pictures (in quick succession), of the mouth and the surrounding area. A computer is used to analyze the movement of tiny wrinkles in the area around the mouth. These movements are represented by a vector field placed over the picture. The vector field is then compared with vector fields in the database, in analogy with previously stated methods. The equipment used is basically the same as for face recognition.

Lip movement recognition is not accurate enough to serve as single method of verification. It is therefore suggested to be used in conjunction with for instance voice recognition.

A special case of lip recognition is called smile recognition. The muscle movements in the lower part of the face, activated while smiling, are different from person to person. These muscles are nearly impossible to control by will and they are visible even if the subject tries to keep a facial expression, like keeping himself from laughing. Since there are no functional systems on the market, it will not be discussed any further.

Hand Geometry Recognition

Figure 11:
FIG. 11 a hand geometry scanner measures the fingers length, width, thickness and curvature.

A hand geometry scanner measures the fingers length, width, thickness and curvature. The system comprises a flat surface with a number of pegs, a light source, a mirror and a camera. The hand is placed on the flat surface, palm faced down and the fingers guided by the pegs. The mirror is used to project the side of the hand into the camera and the retrieved pictures are analyzed. (See FIG. 11)

Unlike for instance fingerprints, a person's hands are not unique. Therefore this method cannot be used for identification purposes, merely verification. According to Lichtermann et al hand geometry recognition is not suitable for automotive purposes due to the ungainly equipment. Since the article was written in 2000, it is reasonable to believe that five years of development might have decreased the size of the equipment. However, hand geometry systems still need approximately nine inches between the camera and the hand in order to retrieve an image, suitable for the analysis. This is too much for making the equipment suitable for in-truck mounting.

Soft Biometric Traits

Soft biometric traits are for instance age, gender, height, weight, ethnicity, and hair and eye color. These biometrics are vague and several of them change through life, they are also easier to forge than, for instance, fingerprints. Soft biometrics can therefore not be used for identification or secure verification. Nevertheless, soft biometrics can be used as a complement to other biometric methods. A weight control could be implemented in a vehicle as a complement to fingerprint scanning Other Methods for Verification People have been able to identify other humans using biometric characteristics for a long time, but the most common ways to confirm identity nowadays are by cards, transponders, passwords and PINs (Personal Identification Number). Most people are used to these verification methods, but to aid comparison of the different verification methods a brief description of each method will be given.

Passwords and Pins

Passwords and PINs do not need much introduction. Presumably all persons reading the present application have used both methods while for instance accessing their computer, withdrawing money from an ATM (Asynchronous Transfer Mode) or starting up their cellular phone.

The major advantage is that the system is quite simple. A keypad and a computer is all that is needed. Other advantages are that it is easy to use, people are used to it and do not find it intrusive.

The drawbacks are that codes and passwords easily can be copied, stolen or forgotten. People also tend to have passwords that are relatively simple to guess, such as the name of their dog or the age of their children. This could make it easier for an impostor to figure out the actual password and thereby pass the verification.

Cards

There are several types of cards for identification/verification purposes. The difference between them is how the card is used in the verification process.

Driver licenses and other ID-cards demand that someone does the matching visually between the photo and the actual person.

Access cards have a magnetic strip to store information and some types use a PIN to verify that the person having the card is the rightful owner. The magnetic strip is read by the ATM, access terminal or cash register.

A smart card is basically a credit-card-sized simple computer. It has a microprocessor and memory embedded on the card. These cards are more versatile than a regular credit card, since much more information can be stored in the memory on the smart card than on the magnetic strip. It is common to use a PIN to verify that the cardholder is the rightful owner. However, the microprocessor on the smart card opens up possibilities to implement more sophisticated methods, such as the Match-On-Card™ technology developed by Precise Biometrics. This technology implies that the actual matching is done by the computer on the smart card instead of by an external computer which is the normal procedure.

Radio Frequency Identification (RFID)

RFID is a method of remotely storing and retrieving data using devices called RFID tags. These tags are either active or passive. The difference between them is that a passive tag does not have any power supply. Instead it retrieves power by magnetic induction from the reader device. This means that a passive tag must be held close to the reader during the actual reading, while an active tag can be read from several meters. A passive tag can, due to its lack of power supply, be made smaller than an active tag. The smallest passive tags are about 0.4 millimeters in square and thin as a sticker, while the smallest active tags are roughly the size of a coin.

RFID tags can be used for verification purposes in the same fashion as cards. The main difference is that it is merely required to hold the tag against the scanner (passive tag) or carry it sufficiently close to the scanner (active tag) in order to do the verification.

Multimodal Verification Systems

A multimodal biometric verification system comprises two or more biometric verification methods working in conjunction. A system merely using one method is called unimodal. As they use several methods at the same time, multimodal systems are of course more expensive, but, as stated below, there are advantages using more than one method of verification.

Here follows an invented example to better explain how the multimodal systems work. One way to understand a multimodal system could be to imagine a system comprising two of the previously mentioned biometric verification methods, for instance fingerprints and iris scanning. That would give the possibility to choose between three configurations.

The subject can choose one method which is the most appropriate at the moment, due to environmental or other factors. For instance, if the driver's hands are dirty, scan the iris, if it is dark in the coupe, scan the fingerprint.

The subject uses both methods independent of each other and the system weighs both results to make the decision. This configuration has been empirically proven to be able to reduce False Rejection Rate (FRR) without increasing False Acceptance Rate (FAR). If the match for one of the verification methods is unsatisfying, but the other method gives a valid match, the subject may still pass the verification.

The system demands that the subject passes both methods, independent of each other. This increases security level since it is harder to deceive two methods than one. A drawback is that these systems tend to have quite high False Rejection Rate.

When using multimodal systems, either security or convenience can be improved, not both at the same time. A drawback with multimodal systems is that the verification comprises several tasks and hence takes longer time, which can be inconvenient for the user.

Multiple Biometric Systems

The multi-modal systems described in the previous section are a special case of the so-called multiple systems. They use several measurements, but not necessarily different methods.

There are basically five types of multiple verification systems:

| | |
|---|---|
| Multi-matcher | A multi-matching system analyzes a scan in two or more different ways or with two different algorithms, for instance (using fingerprint scan) minutiae and non-minutiae based matches. |
| Multi-sensor | A system is called multi-sensor system when two or more different sensors are used to scan the same object. |
| Multimodal | Multimodal systems use two or more different methods, for instance voice and face recognition. |
| Multi-unit | A multi-unit system scans two or more units of the same property, for instance index and middle finger or both the right and the left eye. |
| Multi-impression | Multi-impression systems scan the same property a number of times; for instance demanding the subject to speak his password three times for a voice verification system. |

All of these systems have their obvious advantages and disadvantages. Since it was previously decided to implement three methods focus will be on a multimodal system, the other multiple methods will therefore not be further explained.

Preparatory Work

Due to the two purposes herein, several different working methods have been used and thus various kinds of result have been achieved. In this section, method and results are woven together in order to give the reader a picture of the working-process. Each step is described separately followed by its result. This is supposed to give a clearer view of which decisions that were made in the various steps throughout the process and how the work proceeded based on those decisions.

Inquiry Study

To weigh in the drivers' opinions in the choice of methods to implement, a driver inquiry was made at an early stage.

The Two Different Inquiries

The inquiry was divided into two documents called the attitude inquiry and the method inquiry respectively. The former asked for instance about routines at work, knowledge about biometric methods and feelings of security and safety at work. The latter gave a short explanation of each biometric method described in section 2. The respondents were asked to give spontaneous comments to each method. Some of the questions asked the respondent to grade the answers between 1 and 5, where 1 was always the more negative answer and 5 the positive answer; while some questions only asked for more reflecting answers. All questions had space left for reflections and comments.

The reason for making two different documents was to prevent that the respondents peeked at the following questions and thereby might be influenced by the facts in the descriptions of the different verification methods. Since the inquiry was divided into two parts the drivers were forced to answer the first part before they received the next.

The inquiry was distributed in two ways. The first to give their opinions were truck drivers who had stopped to pause at a truck stop, just outside Gothenburg. Numerous drivers were asked to fill in the inquiry, but only 12 agreed to do so. As gratitude the respondents received confectionery.

Secondly a haulage company in Gothenburg agreed to distribute the inquiry amongst their drivers. Earlier experiences has shown that there will not be as many answers as distributed inquiries and therefore 25 inquiries were given to the haulage company, with the hope to retrieve at least half of them within the limited time of one week. Ten inquiries were answered and returned in time.

There were both a Swedish and an English version of the inquiry, so that all drivers should be able to answer the questions regardless if they knew Swedish or not. This was important at the local truck stop since many of the drivers there only spoke poor Swedish or none at all. All inquiries distributed at the haulage company were written in Swedish.

Results from the Attitude Inquiry

Eleven of the respondents worked with distribution, ten drove long haul and one drove for both long haul and distribution. Twelve of the drivers were the only ones driving their particular trucks, the others shared their trucks with an average of five other drivers. They had worked for an average of 15 years, varying from one year to 38.

Eight drivers knew biometric methods, as example they all knew fingerprint verification. While that was the only answer for some, others could mention several other methods as well. Only one driver had ever used a biometric verification method. Nine of the drivers who had no experiences of biometrics were positive to the idea of using it for verification, four were more restrictive or against the whole idea and the remaining eight were neither positive nor negative. The average score was 3.6.

Eight drivers could see disadvantages with a biometric verification system while eleven could not. Three drivers did not answer the question. Advantages on the other hand, were visible to 15 drivers, while five could not see any and two did not answer the question. On the question of where the biometric data should be kept, 15 of the drivers answered that they would prefer that it was kept on a smart card that they can take with them as they leave the vehicle. Five thought that the storage should be kept at the haulage company and two wanted it in the vehicle. Note that some drivers chose more than one option and three did not answer at all.

Results from the Method Inquiry

Fingerprint verification was by far the most appreciated method; everyone thought it to be the cheapest and the easiest one to use. Even those who did not want biometric verification methods in the vehicle preferred fingerprints. Still, four drivers were concerned that dirty hands would cause troubles. Two respondents imagined scenarios where they lost their fingers or were kidnapped to start the vehicle, but even though they could see these disadvantages, they could still see advantages too. Besides, when asked about the other methods, the drivers sometimes answered that they preferred to use the fingerprint (rather than the method in question).

Regarding the other methods, the mix of positive and negative answers made it difficult to draw any conclusions whether the method was suitable or not. Worth mentioning, since six of the drivers commented it, is that they were skeptic to the voice verification since it is very common that a driver works even if he has a cold or a bad throat. Two had bad experiences from voice recognition technology and were thus skeptic to use voice verification.

Telephone Interview with Haulage Contractors

A verification system like the one in herein would not only be important for the drivers, but also for the different haulage contractors. To get an idea about the various demands from the haulage contractors, a number of telephone interviews were held.

How the Telephone Interviews were Carried Out

Ten randomly chosen offices in Gothenburg were asked to be interviewed over the telephone. Three of them were interviewed and a fourth received the inquiry as an e-mail, answered it and returned it the same way. The questions were almost the same as for the driver inquiries, only that they were now asked verbally instead and slightly adjusted to fit the companies rather than the drivers. The questions were read up loud to the informant and explained if needed. The answers were written down by the interviewer.

It was difficult to get hold of the right person to interview and even when that succeeded it was hard to find someone who had the time to answer the questions. Since the answers were quite similar they still gave a hint on what the companies consider as important. Note that due to the low number of informants, the answers are not always specified in exact numbers.

Results from the Telephone Interview with Haulage Contractors

The working conditions within the four interviewed offices varied, for instance both long haul and distribution was represented, as well as hazardous and high value cargoes. The company size differed from eight drivers to 76. Only one of the companies used external personnel in case of illness or other unexpected absence.

The responses were mainly positive and the companies seemed to know more about different verification methods than the drivers did at the inquiry. The main demand was that it must not be expensive, they emphasized that they wanted high security at low cost. The greatest fear was if the drivers risked loosing an eye or a finger, then it would surely not be worth it. The worst skepticism was against the technology. "What if it fails?" was a common question. Most of them could also see troubles if something happens to the driver, an accident, or something else, that disables him to move the vehicle. "There must be a way to move the vehicle anyway."

Verification by fingerprints was the most appreciated method since all the companies were positive to it. Two persons were strongly against methods that analyses the eye. A third commented that it would be better with fingerprint verification because it is less expensive. No one trusted a verification system using voice recognition with the justification that it is common that the drivers go to work even if they are ill or hoarse. Face recognition was thought to be more expensive than fingerprint verification and was feared not to manage weight gain or the same person with or without a beard. None of the other methods gained any optimism. Hand geometry for instance, was thought to be unnecessary since it was perceived not to be as reliable as fingerprint verification. Also it would increase the risk to loose an entire hand instead of "just one finger."

of this application. The theory study led to reflections and discussions about the methods' suitability in a truck context. All the methods have their pros and cons, but it was not possible to test them all. Thus, it was important to theoretically weigh the different methods against each other to be able to choose which ones to implement in the test prototype. This section describes the results from the discussions and theoretical comparisons.

The Ideal Method

The most desirable properties for the verification system have been listed to give a background to the selection of which methods to implement. These criteria were chosen since they came up during discussions and brainstorming regarding how the ideal system should work.

| | |
|---|---|
| Ease of use | No extensive education should be needed to operate the equipment. It should be as intuitive as possible and as much as possible should be automatized. |
| Speed | The verification process must not take long, a few seconds at the most. The enrollment should also be quick. Furthermore, the method should not consist of too many different tasks. |
| Flexibility | The system should be constructed to handle various drivers who might change shifts. It should be possible to verify the driver while he is driving in order to avoid that a verified driver starts the engine only to be thrown out of the vehicle by an impostor. |
| Cost | The system must not be too expensive otherwise the truck owners will not consider buying it. |
| User acceptance | The system should be non-intrusive. Apart from that, the user and the truck owner must feel that the system is meaningful and beneficial for them. |
| Security | The system must be secure against attacks. |
| Accuracy | The system should achieve a sufficiently low TER (Total Error Rate). |
| Suitability | The system's methods must fit the different environmental properties in the vehicle such as space, lighting, temperature, noise, vibrations and humidity. |
| Integrability | Equipment that is easily integrated into the vehicle can keep the cost down and make the system easier to use since there would not be too many new tasks to master. The equipment needed must not be ungainly, otherwise it will be difficult to mount it in the vehicle. |
| Reliability | The system must never break down or fail with the verification, otherwise it might be unable to prevent unauthorized persons from starting the vehicle. This can cause the driver or owner to mistrust the system. In the same sense, it must never fail to grant access to the proper driver. |

Several of the informants did not feel that their companies were in need of such high security. Instead they pointed out the need of alcohol interlock devices. If they still had to choose something they would go for fingerprint verification. One of the persons was more positive to the whole idea than the others and one was more negative. Notable is that the one who was most negative to the biometric methods for verification liked the idea of so called driver style identification. The vehicles of today can monitor and store a lot of information, for example journey duration, fuel consumption, gear changes and braking technique. By looking at this information it can be possible to observe a driver's driving style. This would not be enough to verify a person, but if the pattern changed drastically it could be assumed that someone else had taken the vehicle. The informant who liked the idea of driver style identification suggested that it should be integrated with drowsiness detection and detection for whether the driver has been taking any drugs or other substances.

Even though the companies did not feel as if they needed a verification system at the moment, they perceived it as positive if it would be harder to steal their vehicles.

Reflections about how the Methods Suit the Purpose

There are several different verification methods on the market today; still there is no perfect method for the purpose Notions about the Different Methods This section contains some annotations arguing for, or against, the different verification methods. The following issues and reflections are connected to the criteria of the ideal system described above. These notions have influenced various aspects of the application.

Notions Regarding Fingerprint Verification

Fingerprint technology is well-tested in the sense that it has been used and developed for a long time. The scanners can be made small and inexpensive and the method is experienced as non-intrusive by most people. A wide variety of brands are available on the market, which vouch for good opportunities to find a product that fits the desired requirements.

One way to increase security for a verification system would be to use more than one finger for the verification. There are two different ways to do this; either the system requires the scanning of a pre-defined set of fingers, or else the system randomly demands for which finger to be scanned at that specific time. One drawback with these alternatives is of course that if a set of prints is demanded, an impostor might try to steal all of a person's prints. In that case, the increased security might be at the cost of the user's safety.

Worth considering regarding the automotive perspective, is that many drivers work a lot with their hands, causing the hands to get dirty or worn, which might affect the scanning result. If the scanner itself gets dirty, proper scanning becomes difficult. This might be solved using a sweep scanner since it does not tend to become as dirty as a touch scanner.

There will always be the possibility of unauthorized people trying to deceive the system. Although vitality detection protects against copies, or the horrible scenario when the impostor steals the entire finger (or hand), it is impossible to make an absolute secure system. Drugs or threats can be used to force the authorized driver to put his finger on the scanner. To sum up, fingerprint scanning is a fast, inexpensive and non-intrusive method that can easily be integrated in the vehicle.

Notions Regarding Iris Scanning

Iris scanning is considered to be an accurate, reliable and safe verification method. According to the literature there is now equipment available that can take an image from a distance of approximately one meter and still get high enough quality to match the image against the template. This means that it might be possible to install a camera in the coupe in such a way that the camera does not disturb the driver or obscure his view. It is however uncertain if these applications are suitable for vehicles and even more uncertain if it is possible to scan while driving, since no test has been carried out in this area.

Iris scanning is thus fast and might not be intrusive, however the suitability as well as the integrability lack for this method and the equipment is expensive due to the license.

Notions Regarding Voice Recognition

A system for voice verification may easily be integrated in a vehicle, perhaps using existing equipment such as the cellular phone hands-free system. It should be possible to use voice verification while driving, at least in the sense that most people are able to talk and drive at the same time. If the driver uses the cell phone or other verbal communication system, the verification demand could be suppressed for a few minutes. In the case when the driver listens to the stereo, it is suggested that the sound is muted during the verification.

The coupe of a modern truck is sound isolated, which is noticeable when stepping inside. Due to the sound isolation, background noise from the engine, wind and surrounding traffic is pretty much constant. It should therefore be possible to use an adaptive filter to remove noise from the voice sample during verification. But even if most truck coupes are well isolated, the voice verification systems are developed for indoor office use, thus it is difficult to say whether it is suitable or not without testing the system in a vehicle environment.

The downside is that the database will continuously need updates since a person's voice and accent changes over time. Furthermore, a person's voice can change rapidly due to health related and emotional factors. These aspects have caused some people to mistrust the technology.

Since the focus of this application is to verify a driver's identity, the usage of a pre-defined verification phrase is suggested. If each driver has a unique password, both the phrase itself and the voice sample, can be used for verification. Voice verification is thus an inexpensive method, which easily can be implemented in a truck. However, due to the noisy environment and the fact that the voice changes over time it is uncertain how well it works in real situations.

Notions Regarding Face Recognition

Face recognition is sensitive to light conditions, but it can be an alternative to use before starting the vehicle since it is possible to add more coupe lighting during the verification. However, it is not recommended to do so while driving since it can be disturbing for the driver. The light conditions change throughout the day, it is therefore uncertain if face recognition can be used while driving. A picture taken during nighttime might not be similar enough to the stored image for the system to succeed with the verification. Different light conditions will be tested, since a camera in the vehicle gives many other possibilities like drowsiness detection, coupe surveillance, etcetera. However, these possibilities are beyond the purpose of this application, thus they will not be further investigated.

The time-consuming part of face recognition is the template creation. During verification the system might need to take three or more pictures to ensure that at least one of them is good enough. The template creation takes about 3-5 seconds which means that the entire verification process will take about 10-15 seconds which is too long.

One interesting side effect is the fact that the camera used actually takes pictures of the person intending to drive the vehicle. If an impostor drives the vehicle, the verification will fail but pictures are still taken and stored. These pictures can then be used when trying to identify him.

Summarized, face recognition is a user friendly, inexpensive and non-intrusive method. Yet, it was not possible to find any research on face verification in environments that resembles the coupe of a vehicle and it is therefore uncertain how well the method suits the purpose.

Notions Regarding Facial Thermography

One idea regarding the use of face recognition is that it might be possible to use it for automated verification while driving. This however will only be possible if the system is not too sensitive to changing light conditions. As explained above, facial thermography and face recognition are practically the same; the difference is what type of camera that is used. Facial thermography uses an IR-camera, which means that the method is not as sensitive to light conditions compared to face recognition.

It is difficult to tell how facial thermography corresponds to the ideal method since no test has been carried out and no developing-kit is available.

Notions Regarding Retinal Scanning

Today's retinal scanning equipment has decreased both in size and cost, thus solving some of the practical problems. A larger problem is the fact that some people have aversions against having their eyes scanned. Besides, the method is not suitable for in-vehicle use, especially not while driving, since the driver would have to look in a specific direction during the scanning. It may render problems to keep the eyes concentrated on one single point long enough for the verification and this can affect traffic safety negatively. Hence, with the technology of today, this is not a method to use for the purposes of this application.

Notions Regarding Hand Geometry Recognition

The main benefit with hand geometry recognition is that this method is quite insensitive to dirt, calluses and scars (within reasonable limits). As it is several features of the entire hand that is measured, it does not matter if the fingers are dirty or if the person has accidentally cut himself etcetera. The equipment is cheap and the verification takes less than one second, but the ungainly equipment makes the method unsuitable for automotive purposes.

Notions Regarding Multimodal Systems

With a multimodal system, different levels of security can be accomplished by combining different methods. For everyday use it can be enough with fingerprint verification. When driving in dangerous areas, or carrying hazardous goods, verification can be done using several methods (for instance both fingerprint and iris scanning) and hence increasing the security level.

One interesting aspect of multimodal systems is that they can be used for automatic update of the template database.

Imagine a verification system that uses three verification methods randomly, for instance, PIN, fingerprint and facial recognition. When the system demands for driver verification, it analyses all three characteristics. If two of the methods complete successfully, the database can be updated using the third sample. Thus if the PIN is correct and the fingerprint scanner gives a good match, the system can take a picture of the face to update the template database. This can save large amounts of time since the system continuously updates the database itself; thus reducing maintenance of the system.

Selection of Methods for Prototype Implementation

The theoretical analysis of the different verification methods, led to the notions and reflections, which were listed in the previous section. The notions and the SWOT-analysis form the main platform for selection of verification methods to the prototype implementation.

Method Selection

No verification method alone can fulfill the criteria of the ideal system. The final decisions of which methods to use were based on a balance between accuracy and cost as well as between ease of use and ease of deceiving. The other criteria from the ideal system did not differ significantly between the methods and were therefore not considered during the selection. The pros and cons for each method were discussed, as well as the price and delivery time.

Selected Methods

The reasons for discarding a method are listed below, followed by the reasons for choosing the methods that were to be implemented.

template storage with the upcoming digital tachometer, a smart card reader was also included in the system.

To sum up, the methods chosen for the prototype system are: fingerprint, face recognition, voice recognition plus PIN- and card verification.

Use Cases

Different kinds of work situations and areas where trucks are being used raise various challenges for a verification system. Reflections on how the system could be used led to the development of a number of use cases. By creating realistic use cases, the benefits as well as a demonstration of the actual need for a driver verification system are pointed out.

Developing the Use Cases

These use cases are based on discussions and brainstorming during the process of choosing methods for the implementation.

Multimodal Verification Using all Biometric Methods

This is the highest security level, intended for vehicles carrying hazardous or valuable goods or while driving in high-risk areas. The driver verifies his identity using all the methods to assure that he is the appropriate person. Below are some examples for how this verification might proceed.

The driver has arrived at the garage to start the working-day. As he enters the vehicle he inserts his smart card (integrated in the card for the tachograph) in the reader, dials his PIN-code and then places his finger on the scanner. The PIN is correct and the finger is verified against the card, so the system asks for a voice sample. The driver says his password in the microphone. A system message appears, telling the

| | |
|---|---|
| Facial thermography | IR-cameras are more expensive than regular cameras, but since the method is very accurate and hard to fake, it is definitely an area to take a closer look into. Unfortunately, little research has been done regarding facial thermography for verification purposes and the authors have been unable to find a company that manufactures equipment for this type of verification. |
| Iris scanning | A development kit for iris scanning costs about $25000-$35000 which is beyond the project budget. |
| Lip movement | Lip movement recognition needs another verification method to be reliable enough. The idea is to implement three methods for verification to test their suitability and compare them to one another. In order to enable the possibility of different security levels, all three methods should be reliable on their own, thus lip movement recognition is not an option. |
| Retinal scanning | Retinal scanning is not suitable for automotive purposes due to the exact eye alignment required. |
| Hand geometry | The equipment required for hand geometry scanning is too ungainly to fit in the coupé. |

The three remaining systems, fingerprint verification, voice recognition and face recognition are all suitable for in-car mounting and there were manufacturers who could offer development kits at reasonable prices and delivery times.

In order to make the system integration as easy as possible it was desired that all systems were compatible with the same platform. This, together with the ability to deliver support, was the two main criteria when choosing manufacturer.

PINs are common today and the method can easily be implemented in a vehicle using the keypad for the cellular phone. Therefore a PIN-verification system was implemented as well. This would also enable a comparison between a common verification method and the biometric ones.

As presented in the results from the inquiry, many of the respondents preferred that the biometric templates were to be stored on a card, which they could take with them when leaving the vehicle. To illustrate the possibility to integrate the driver to sit in a normal driving position, in order to perform the face verification. Recorded data is analyzed and compared to the template data stored on the smart card—the verification was successful. The name and employment identification number are sent, encrypted, to the back-office.

The driver goes through the verification procedure, but fails with one of the methods. A system message informs the driver about the failed verification. The procedure continues, as in the example above and at least one method succeeds. The name and employment identification number are sent, encrypted, to the back-office, together with information about the failed verification(s).

On a long haul trip the driver takes a nap in the coupe. As he wakes up he goes outside to stretch out his legs before continuing his journey. The passenger door opens and an impostor climbs in and takes the driver seat. The impostor tries to start the vehicle but does not succeed with the verification, thus the vehicle is immobilized. A warning is immediately sent to the back-office and the system takes a picture of the person behind the steering wheel. This picture is also sent to the back-office.

Multimodal Verification Using Two Biometric Methods

The purpose with this use case is to assure that the person who enters the driver seat is the appropriate driver. Four different situations at this security level have been developed, see below. Note that it is possible to have the vehicle equipped with only two biometric verification methods. However, there is also the possibility to have all the equipment needed for all the methods and then randomly alter which one to use at each occasion.

The driver has arrived at the garage to start the working-day. As he enters the vehicle he inserts his smart card (integrated in the card for the tachograph) in the reader, dials his PIN-code and then places his finger on the scanner. The PIN is correct and the finger is verified against the card. The system asks for a voice sample so the driver says his password in the microphone. Recorded data is analyzed and compared to the template data stored on the smart card—the verification was successful. The name and employment identification number are sent, encrypted, to the back-office.

The same scenario as above, but instead of the voice verification a system message appears telling the driver to sit in a normal driving position, in order to perform the face verification. Recorded data is analyzed and compared to the template data stored on the smart card—the verification was successful. The name and employment identification number are sent, encrypted, to the back-office.

The driver fails with one or more method(s), but at least one method succeeds. The driver's name and employment identification number are sent, encrypted, to the back-office, together with information about the failed verification(s). None of the verifications succeeds thus the vehicle is immobilized and a warning is immediately sent to the back-office.

Single Biometric Verification at Different Security Levels

This verification is suggested to occur after a shorter stop, after that the driver has already been verified with several methods, or if the security level makes it sufficient with only one biometric method. The security levels can of course be discussed, but in these examples they are classified as high, medium and low security level. Here follows some examples for high security.

The driver is unloading cargo at one of many stops during the day. The vehicle is standing still with the engine running. When finished unloading the driver climbs back into the truck. It is a short stop, therefore only one verification is required, which method it will be is established at random. This time the system requires fingerprint verification, so the driver puts his finger on the scanner, to verify that he is still the one driving the vehicle. As the system verifies the driver he can drive off, while his name and employment identification number are sent, encrypted, to the back-office for confirmation.

The driver has stopped to buy some snacks at a truck stop. It is a quick stop with the engine left running, thus only one of the methods available will be required for verification before driving off. An impostor takes place in the driver's seat, which initiates the verification. Since no successful verification is carried out, the system takes a picture with the camera and sends it together with a warning to the back-office. The truck is immobilized.

The verification system is intended to increase the security, but it must not affect the driver's ordinary work. To make it as easy as possible the medium security level gives the driver more independency than the higher level does.

The driver makes one of many stops during the day to unload some cargo. The vehicle is standing still with the engine running. When finished unloading, the driver climbs back into the truck. As he sits down he puts his finger on the scanner, to verify his identity. The system checks if it is ok to use fingerprint this time, or if the driver must use one of the other methods. This time the system requires another type of verification why the driver is encouraged to verify his identity by saying his password. The verification succeeds and the driver can drive away, while his name and employment identification number are sent, encrypted, to the back-office for confirmation.

The driver has stopped to unload some of the cargo. The engine is left running. The driver gets back in the vehicle and dials his PIN-code. As the driver is stressed he dials the wrong numbers, he tries again and again, but he still does not remember the code correctly—the verification fails. The system informs the driver that the verification has failed and asks him to verify his identity using fingerprint scanning instead. The verification succeeds and the driver can drive off. The driver's name and employment identification number are sent, encrypted, to the back-office for confirmation, along with information about the failed PIN-verification.

A low level of security may only require one method for verification. This means that it can be enough for the vehicle to have equipment for one single verification method. It also gives the possibility to have several methods in a truck and depending on for instance the cargo, route, or length of a break, only demand for one method. A verification system in the vehicle can be presumed to increase security. However, with only one method it is naturally a higher risk that frauds succeed than with several verification methods.

The driver is unloading cargo at one of many stops during the day. The vehicle is standing still with the engine running. When finished unloading the driver climbs back into the truck. He sits down and puts his finger on the scanner, to verify his identity. As the system has verified the driver he drives off and his name and employment identification number are sent, encrypted, to the back-office for confirmation.

The driver has stopped to unload cargo. As the driver has already identified himself earlier that day, one verification method will be enough, even though the vehicle has a higher level of security. Another driver, who also has a smart card with his biometric data stored, takes the driver's place and tries to verify his identity. The system notices that the card is taken out and a new one put in, so a single verification will not be enough. The driver verifies his identity with all methods and the information is sent, encrypted, to the back-office, where it is quickly discovered that it is not the appropriate driver who is driving the vehicle.

The driver has stopped to buy snacks at a truck stop. It is a quick stop with the engine left running, thus only one of the methods available will be required for verification before driving off. An impostor takes place in the driver's seat, which initiates the verification. Since no successful verification is carried out the vehicle is immobilized. The system takes a picture with the camera and sends it together with a warning to the back-office.

A driver enters the vehicle. He puts his finger on the scanner but does not succeed with the verification. Since this was the only method available a warning about the failed verification is immediately sent to the back-office. The vehicle is immobilized.

Manual Verification while Driving

A possible scenario might be that an impostor forces the driver to verify his identity and then throw him out of the vehicle. To avoid this and similar risks, the driver should also be verified while driving. Below follows some examples to explain the idea.

The vehicle is out on the roads. A system message appears, asking the driver to say his password to verify his identity. The driver does so and succeeds with the verification. His name and employment identification number are sent, encrypted, to the back-office.

The driver is out on a long haul assignment. A system message appears, asking the driver to say his password to verify his identity. The driver does so, but the verification fails since he is hoarse this day. The driver tries two more times, but the verification still fails so the system asks him to put a finger on the scanner instead. This time the verification succeeds. The driver's name and employment identification number are sent, encrypted, to the back-office together with information about the failed verification.

The vehicle is out on the roads. A system message appears, asking the driver to put a finger on the scanner to verify his identity. The driver cannot verify his identity with any of the methods. A warning is immediately sent out to the back-office, together with a photo of the unverified driver taken by the camera for face verification. Since the driver was verified before starting the vehicle that driver's name and employment identification number are sent, encrypted, to the back-office, together with information about this failed verification while driving.

A vehicle, with equipment for several verification methods, is out on the roads. A system message appears asking the driver to put a finger on the scanner to verify his identity. No verification is done within the following three minutes, a warning is therefore sent out to the back-office.

The vehicle is out on the roads. A system message appears asking the driver to put a finger on the scanner to verify his identity. The verification fails and since this is the only method for verification in this vehicle, a warning is immediately sent out to the back-office.

Automatic Verification while Driving

This verification is done without intervention from the driver. This implies several advantages, for instance the driver is not disturbed even if his identity is verified while he is driving and an impostor does not even know that the system tries to verify him. To make an automatic verification possible the vehicle must provide face recognition equipment. Below follows some examples of automatic verification while driving.

The vehicle is out on the roads. The system takes pictures of the driver and compares the characteristics with the template on the smart card in the tachograph. The verification succeeds and the driver's name and employment identification number are sent, encrypted, to the back-office.

The driver is out on a long haul assignment in a vehicle with several possible verification methods. The system tries to verify the driver against the template on the smart card in the tachograph. The verification fails, so a system message appears asking the driver to put a finger on the scanner. This time the verification succeeds. An encryption of the driver's name and employment identification number are sent to the back-office together with information about the failed verification.

In a similar situation as above, the verification fails so the driver is asked to put a finger on the scanner. No method for verification succeeds so a warning is immediately sent out to the back-office, together with a photo of the unverified driver taken by the camera for face verification.

The vehicle is out on the roads. The automatic verification fails and a system message appears, asking the driver to put a finger on the scanner to verify his identity. No verification is done within the following three minutes, a warning is therefore sent out to the back-office together with information about the failed face verification and the absence of verification by any additional method.

Design and Implementation of the Prototype System

When the verification methods were chosen and the equipment had arrived it was time to put the system together. The system was developed using an iterative development process and resulted in the design shown in this section. An overview of the implemented verification system is demonstrated and the software demands for such a system are explained together with a description of the implementation.

Hardware

Manufacturers for the hardware were mainly chosen from three criteria: cost, delivery time and compatibility. The first part of this section describes the hardware and the second part describes the result of the implementation.

The Hardware of the System

The equipment used for this project are listed and described below.

The fingerprint verification system used is a BioCoreII from Precise Biometrics AB, Sweden. It is an embedded system, hence hardware was included in the kit.

The face verification system is a VeriLook SDK 1.1 from Neurotechnologija Inc., Lithuania. The camera, a Logitech QuickCam 4000 Pro, was chosen with respect to the recommendations from Neurotechnologija Inc.

For the voice recognition, a license for VoiceKey SDK from SpeechPro Inc., Russia, was purchased. The face verification camera had a microphone embedded in order to use for internet conferencing; this was a bonus since that microphone could be used for the voice verification system. However, due to lack of time, the voice recognition was never implemented in the system.

The Implemented Verification System

Figure 12:
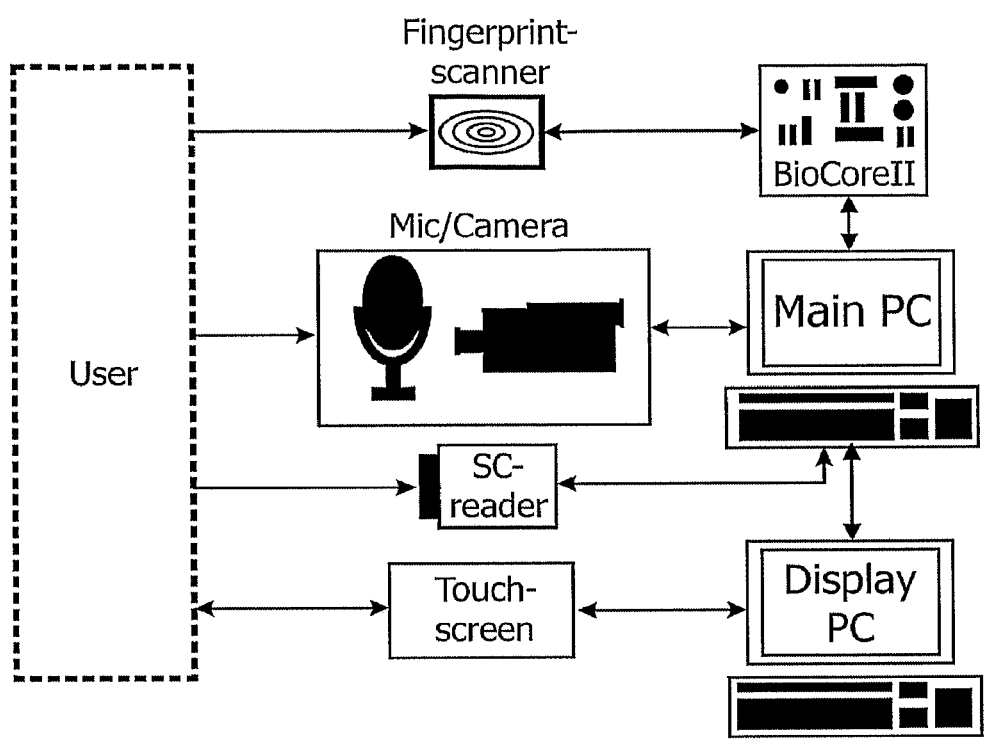
FIG. 12 an overview of an implemented verification system, the arrows show how the different parts communicate with each other.

Below is an overview of the implemented verification system, the arrows show how the different parts communicate with each other. (See FIG. 12)

| | |
|---|---|
| SC-reader | ISO7816 standard Smart Card reader |
| Fingerprint scanner | RF fingerprint scanner, which sends fingerprint images to BioCoreII. |
| Camera | Standard VGA web camera attached to the main PC via USB |
| Mic | The microphone embedded in the camera. |
| BioCoreII | Embedded fingerprint verification system. Receives fingerprint images from the fingerprint scanner. Sends and receives templates to/from the Main PC and handles the actual fingerprint verification process. |
| Main PC | A PC, which collects data from fingerprint scanner (via BioCoreII), microphone and camera. The computer also holds template database and algorithms for weighing results together to give/deny authorization. |

| | |
|---|---|
| Display PC | The display PC runs the GUI and presents information on the touch-screen mounted in the center console of the truck cabin. |
| Touch-screen | Touch sensitive 7" wide screen TFT-monitor mounted in the dashboard of the truck cabin. Used to present information and instructions and to serve as keypad during the PIN verification. |

Placement of the Equipment

Figure 13:
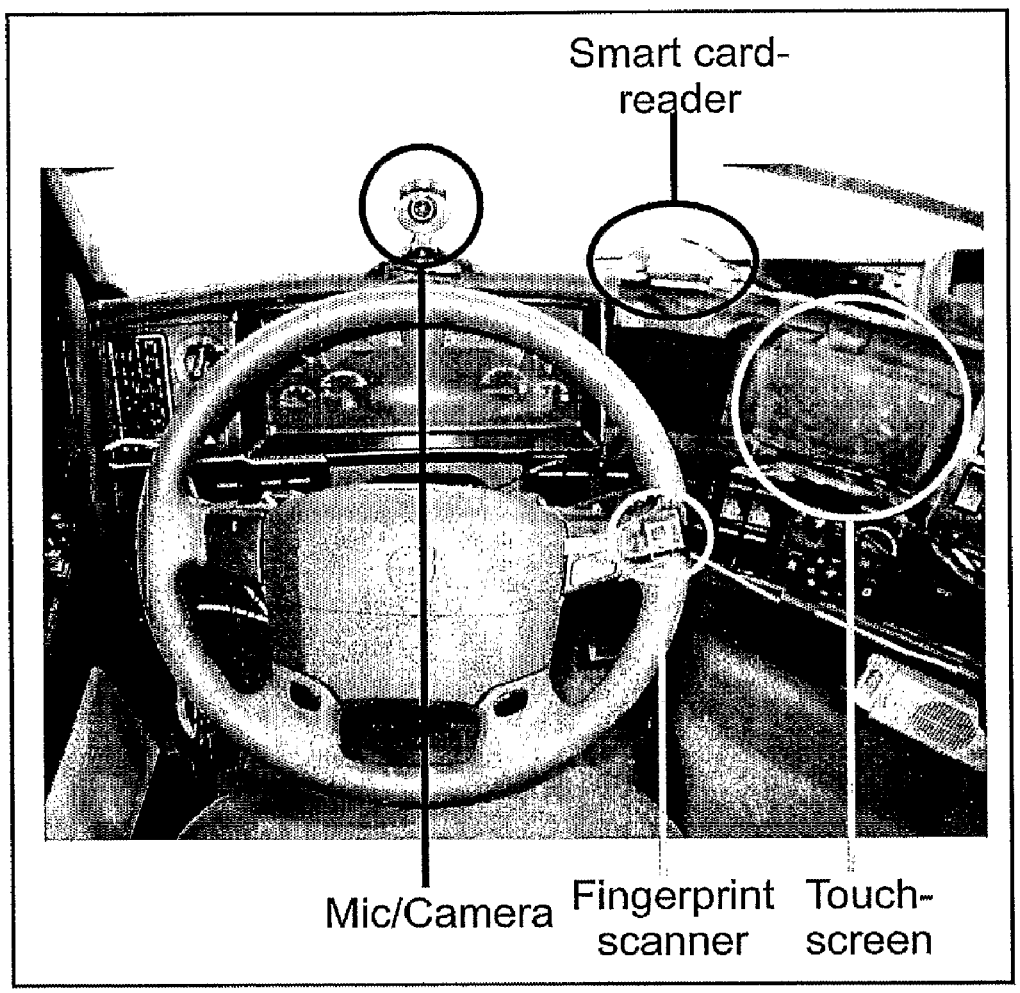
FIG. 13 a picture of parts of the system mounted in the truck coupe.

Before implementing the system in the simulator the placement of the equipment was discussed. There were plans to place the fingerprint scanner on the gearshift lever, but since it was missing in the simulator, the scanner was placed on the steering wheel. The face recognition system requires a picture retrieved from an angle not exceeding 5 degrees in any direction. This gave two possibilities of camera placement, either above the instrument cluster or in the roof above the windscreen. With the latter placement the system performed poorly and thus the camera was placed above the instrument cluster. The dashboard had an opening that fitted the screen well. This mounting also gave the keypad an authentic placement. Below is a picture of parts of the system mounted in the truck coupe. (See FIG. 13)

Software

All three manufacturers offered development kits for a C++ environment and therefore this development platform was chosen. The actual implementation (e.g. the code itself) is not important for the purpose or the results of this application and will therefore not be described in further detail.

Graphical User Interface (GUI)

The purpose of the GUI was to allow the user and system to communicate with each other. The design phase as well as the result is presented in this section.

Developing the GUI

First a low-fi prototype was sketched on paper, one paper for each message that would be shown during the test. There were both written messages and illustrations, and some of the messages had two or three versions. The written messages were all in Swedish since this was supposed to be the mother tongue for the test participants. A search for suitable sounds to supplement the messages was also carried out. The low-fi GUI was shown, individually, to five VTEC-employees who had little or no experience of designing GUIs, in order to get their reactions. They were first shown one version of the messages in the succession they would appear in the test. Secondly they were shown alternative versions and were asked to give their opinions on which one to use.

The low-fi GUI was then shown to a person with vast experience of working with GUIs and test situations. The test scenario as well as the GUI was discussed and two annotations were added. The GUI was then implemented in Macromedia Director MX.

Result of the Implemented GUI

Figure 14:
FIG. 14 two examples of a graphical user interface.

Every step in the verification procedure had a written message (in Swedish), an illustration and a sound. Two different sounds were used to attract the driver's attention to the screen. The first one served as indication that a new task was demanded, or that the recent task was successfully carried out. The second sound was used to illustrate if the verification failed or an error had occurred. Additionally the picture turned green for success and red for failure. Below are two examples from the GUI. (See FIG. 14)

The Driving Simulator

A simulator was required to enable as realistic circumstances as possible during the test of the system prototype. VTEC has a simulator, which was supplied for this test. The simulator has three projectors illuminating a big arched screen. This type of setup is to enhance the feeling of actually moving and to enable the driver to perceive the surroundings in a more natural way than with using only one projector and a flat screen. A Volvo FH12 cabin is placed in the middle of the room, in front of the screen. It was possible to turn on speakers with a simulated engine sound.

Figure 15:
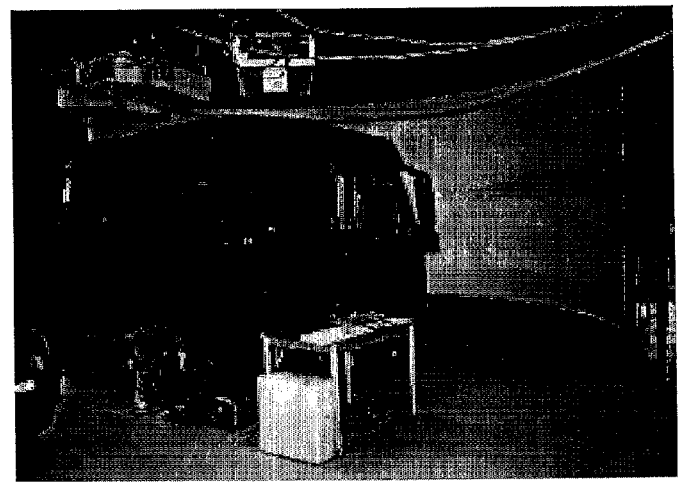
FIG. 15 a picture of a simulator.
Figure 16:
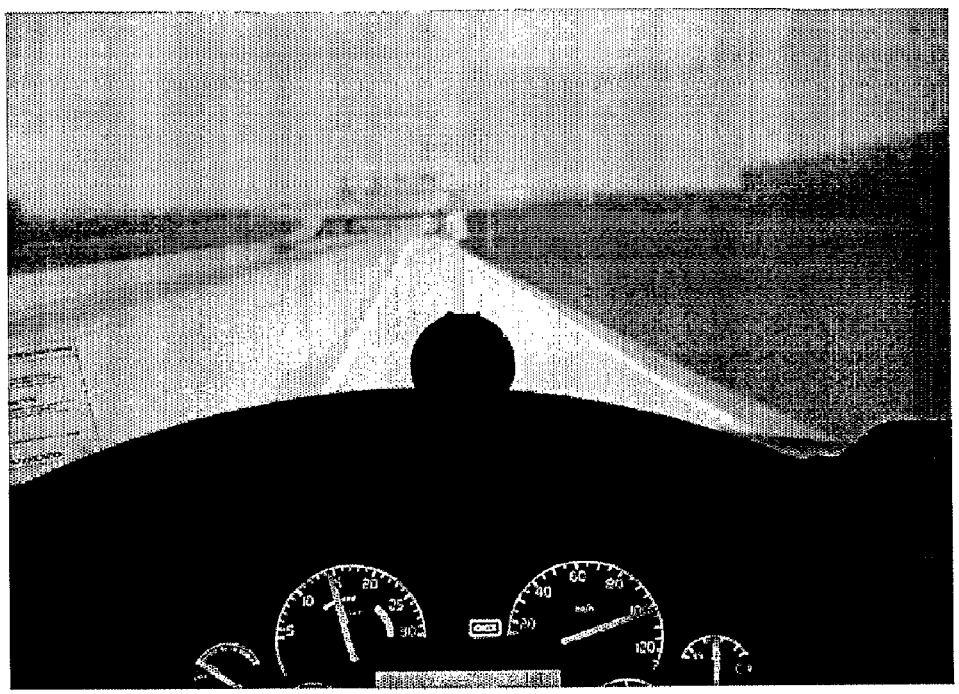
FIG. 16 a picture of a simulator.

The simulator had up till recently been used for tests with a car, the cabin and the simulator were therefore not yet fully synchronized. There were additional properties that did not suit the test very well and the authors had no possibilities to change them. For instance, inside the driver had throttle and break, but no parking brake, clutch, gearshift nor cruise control. The tank was always empty and neither the tachometer nor the odometer was adjusted to represent a truck. Since there was no parking brake, the simulator had to be turned off if the driver needed to stop and leave the vehicle. As long as the break was pressed down the simulator did not move, but when releasing the break (such as when leaving the coupe) the simulated vehicle continues to slowly move forward. (See FIGS. 15 and 16)

The Preparations Before the Test

The idea to put a verification system inside a truck led to several questions about when such a system would be used, what it could be used for and how often the verification should be done. Some of the hypothetical questions might be possible to answer with the help of a simulator test; others need more research and authentic tests.

The preparations for the test mainly comprised four parts; to prepare the interview questions, to outline a scenario for the simulator, to find a satisfying number of appropriate test subjects and to conduct a pilot test. As previously mentioned questions regarding when and how the verification should be carried out were raised during the preparatory work. The interviews and the test scenario were outlined in order to answer these questions (among others).

Interviews

As the test approached, the inquiry questions were adjusted in order to suit the interviews. To enable a comparison, with the results from the preceding inquiries, many questions were made similar.

Developing the Interview Questions

Two interviews were prepared. The first was to be held before the simulator test and the second, more exhaustive, interview was to be held afterwards. Some of the questions from the preceding interview were repeated to see if the driver had changed opinion during the test. The questions were read and commented by two behavioral scientists in order to see if there should be any re-defined, added or deleted questions.

The Questions

The first interview started with questions about the driver's working-routines. The questions also treated issues like security and what it meant to the driver. After investigating the driver's knowledge of biometrics, the different methods used in the test were introduced to enable spontaneous reactions. The driver was also asked if he could see any advantages or disadvantages with a verification system.

The second interview asked about the test experience. The driver was asked to grade the different methods and once again give his opinion of possible advantages or disadvantages.

Many of the questions were graded, always from 1 to 5, where 1 stood for the negative opinion and 5 for the positive.

The Test Scenario

To find out what was needed for the implementation in the simulator and to try to see what would be possible to test, a test scenario was outlined.

Outlining the Scenario

These notions served as inspiration during the creation of the test scenario. It was outlined through brainstorming and discussions, and led to a final test scenario where several aspects of the problem were included. It was desired to test as many methods as possible, both while standing still and while driving. In the same time the scenario should be as realistic as possible, avoiding the risk that it might contain too many different tasks on the short duration of the test. Otherwise the test participant might perceive that he must verify his identity extremely often, which would not be the case in real life. The result was a balanced but yet exhaustive scenario.

The Test Scenario

Figure 17:
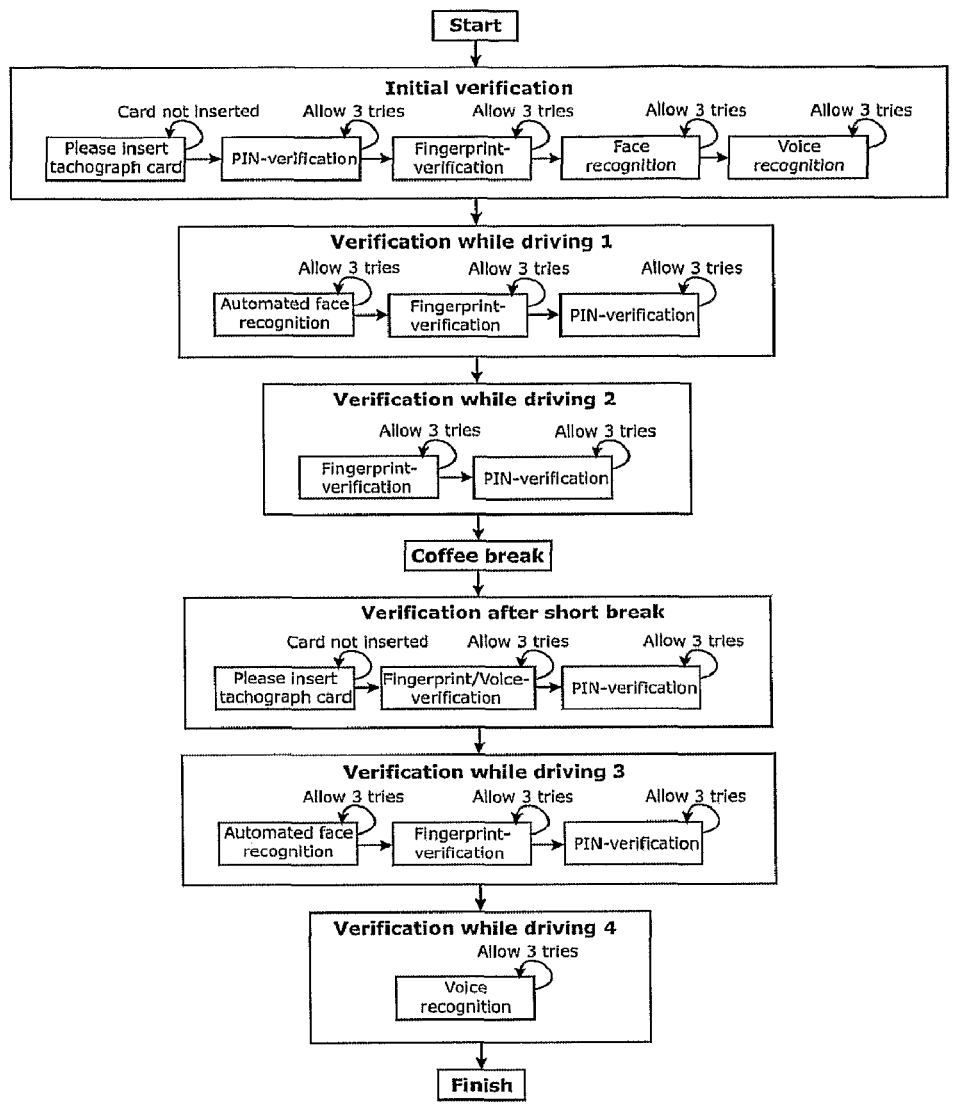
FIG. 17 a test scenario with a thorough initial verification with a coffee break followed by a short verification, using either fingerprint or voice and another verification while driving was requested.

The test scenario starts with a thorough initial verification. The driver should then get some time to get used to the simulator before fingerprint verification while driving was requested. After approximately half the time in the simulator a "coffee break" was to take place. After the break the driver had to go through a short verification, using either fingerprint or voice. Yet another verification while driving was requested before the test ended, this time it was voice verification. Two automatic verifications were done while driving, one in the beginning and one after the break. If they failed, the driver would be asked for fingerprint verification instead, but if succeeded, he would not be informed about it during the test. (See FIG. 17)

Recruiting Test Persons

The recruitment of truck drivers to the test was outsourced to an external company. They were asked to recruit 20 drivers and they were also told that a mix of long haul and distribution drivers was desired. During the recruitment the drivers were told that they would participate in a driving simulator test, where usability and user acceptance were going to be evaluated. The purpose with giving vague information about the test during the recruitment was to receive a satisfying mix of drivers with different background and expectations.

Pilot Test

Pilot tests were carried out before the actual test, to make it possible to improve the system and adjust the scenario and the interviews.

Questions that were meant to be answered by the pilot test were for instance:

Is the scenario realistic? Is it too many/few tasks, in too much or not enough time? Should things occur in a different order?

Is the GUI well designed? Is it clear what to do at all times? Is the sound hearable and suitable at that particular moment?

Is the placement of the camera acceptable? Can you easily reach the fingerprint sensor and the keypad? Does it feel awkward to say the password into the air instead of directly into a microphone?

Are the interview questions significant and correctly formulated? Is it too many/few questions?

Does the test take too long or can additional tasks be added? Does it feel comfortable to be filmed and observed by a test supervisor in the cabin?

The Procedure of the Pilot Test

Employees at VTEC with various experience of truck driving were asked to participate; among them a behavior scientist, who was especially asked to give opinions on the interviews. All together six males participated. Three of them went through the entire test procedure, with both interviews, acceptance inquiry and simulator scenario. The other three were not interviewed but merely enrolled in the system, instructed about the simulator and testing the scenario. Different light conditions were tested to see the requirements for the face verification.

Results from the Pilot Test

The pilot test implied modifications to the system in order to increase stability and usability, and to make the test as authentic and exhaustive as possible. A third sound was added so that the user received auditorial feedback when dialing a digit, instead of just the asterisks that show on the screen during the PIN-verification. Some of the interview questions were adjusted to be more specified.

No participants could be enrolled (for face recognition) if it was too dark and it became apparent that the light from the simulator screens alone was not enough for the enrollment. On the other hand, the room must not be too lit up since this affects the image quality of the simulator. When experimenting with more light inside the coupe, problems occurred with people wearing glasses, since the extra lighting caused reflections. Eventually a lighting set-up was found, which made it possible for all test subjects to be enrolled and verified by the system. An interesting observation during these light experiments was that it was possible to verify some people (who did not wear glasses) with less light in the room, than it had been when they were enrolled.

The Test

This section describes the final test of the prototype system. The first part describes how the test and the interviews were carried out, the second part presents the results.

The Test Procedure

The verification system was tested in a simulator, as previously mentioned, to make the test situation as authentic as possible. Unfortunately two drivers had to cancel, thus only 18 of the invited drivers were able to attend, all male. The drivers were tested and interviewed one at a time.

Before the Simulator Test

When the test participant, from now on also referred to as the driver, arrived he was welcomed by the test supervisor. He was informed, both verbally and in writing, of his rights and obligations, for instance that his anonymity was guaranteed and that he could discontinue the test at any time. He was told that he would first be interviewed about his work and then drive the simulator before he would be interviewed again about that test experience. The test supervisor asked for permission to record the interviews.

One of the inventors was test supervisor during all tests; the other acted as the technician and was responsible for the enrollments and the video recording.

First Interview

The testing phase began with an interview about the driver's ordinary working day, routines at work, his opinions on security and what kind of knowledge and experiences he had of biometrics. The first interview endured for approximately 20 minutes and was held in a conference room next to the simulator. The test supervisor wrote down the driver's answers or interpreted and graded them from 1 (negative value) to 5 (positive value), depending on the type of question. If the answer to a grading question was vague the driver was asked to score between 1 and 5. In case the driver seemed to have misunderstood a question it was explained by the test supervisor.

Enrollment

After the initial interview the test participant was shown to the simulator and asked to take place and adjust the seat and the steering wheel to a normal and comfortable driving position. Before the enrollment began, the technician verified that the camera could get a clear view of the driver and, if necessary, the driver was asked to lower the steering wheel.

The driver was given a PIN and then the enrollment phase began. He was shown which part of the fingerprint to place on the scanner. Since the scanner was placed on the steering wheel the participant had to use the right thumb, the other fingers would be difficult to get in the right position for the scanning. He had a chance to try a few times to place the thumb on the scanner in order to get used to the proper placement. After that the fingerprint was enrolled. The technician then asked the driver to look straight ahead at the simulator screen as if he was driving, this was in order to retrieve the face recognition template. For the voice verification the driver was told that a phrase that endures for at least three seconds was required, in order to make it possible for the computer to analyze it. He was also told that the microphone was embedded in the camera, so that he only had to say the password out loud. The driver was given the password "My name is First name, Surname". As previously mentioned, the function of the voice verification was only simulated.

Simulator Instructions

When enrollment was completed, the driver was given the smart card and was told that this was his personal digital tachograph card during the test. He was then asked to step out of the vehicle to receive instructions about the simulator and the test scenario.

The driver was informed that he would be filmed during the test and that he had the full right to discontinue the test at any time if he would feel uncomfortable. He was told that some people do become nauseous in the simulator even though they normally do not feel sick in vehicles. The driver's attention was directed to the simulator image, which for the moment was standing still in the middle of a highway. He was told that the test supervisor was going to sit beside him inside the coupe to guide him along the way. He was instructed that he would be driving on the highway for a while, then turn to the right and continue till he came to a village. In the village he would stop for a break, after which the scenario continued with yet a couple of minutes of driving. The driver was informed about the existing equipment in the simulator as well as the missing equipment (mentioned in The driving simulator). The driver was told to imagine that the scenario lasted for an afternoon, instead of the 20 minutes that they actually were driving.

After these brief instructions, the driver was asked to re-enter the cabin to commence the test. The test supervisor entered the vehicle from the other side and started the simulation when the driver was seated and shut the door.

The Simulator Test

The driver took place in the driving seat. The test supervisor entered the vehicle from the other side and started the scenario when the driver shut the door. As he inserted the smart card the initial verification started. This first verification comprised all four methods and the driver was allowed to fail each method three times before the system moved on to the next one. If the driver passed at least two of the first three methods, the entire initial verification was considered successful. The fourth method was voice recognition, which was only simulated during the test.

As previously described the test began on a simulated highway. After some time, the test supervisor trigged the first verification while driving, which was the automated face recognition. Note that the driver was not informed about this verification unless it failed. In case the automated verification failed the system would ask the driver to verify his identity using fingerprint verification. If this also failed, the system asked the driver to dial his PIN.

The test participant continued driving and after some time the test supervisor trigged the next step, which was the second verification while driving. A system dialogue appeared, asking the driver to verify his identity by using fingerprint. In case the verification failed the driver was demanded for a PIN-verification.

After yet some driving, the road led to a small village where the driver was asked to pull over for a coffee break. (This was approximately 12-13 minutes from when the driver had entered the vehicle to start the scenario.) The driver and the test supervisor stepped out of the truck and went to another room where the driver was offered some refreshments. This had two purposes; the first one was to simulate a shorter break initiating a shorter verification procedure when trying to drive off again. The second was to give the driver an opportunity to give the test supervisor spontaneous comments and reactions on the first part of the test. To enable statistical comparisons to other automotive systems an acceptance scale [56] was handed out to the drivers during the break. Since the participants' mother tongue was Swedish, they all received a Swedish version of the acceptance scale. The scale comprises nine pairs of contrary words, five are thought to reflect usefulness and four the satisfaction. By adding the answers regarding usefulness and satisfaction, respectively, an average can be calculated out from that and thereby score the usefulness and the satisfaction between −2 and +2. The test supervisor explained that it was only the verification system, not the simulator, that was to be evaluated. If the driver did not understand the acceptance scale by reading the written instructions, the test supervisor explained further and then let the driver fill in the answers in privacy.

Some of the drivers took the "tachograph card" with them as they left for the coffee break, but most of them left it in the reader. The scenario was continued by the test supervisor as the driver once again took place in the driver seat after the break. If the driver had left his card, the system started right away with the verification. If the driver had taken the card with him, the system started by asking for the card, before commencing the verification. For the first ten participants the system asked the driver to verify his identity using fingerprints, for the remaining eight, voice verification was used. If this single verification failed, the driver was asked to dial his PIN. The scenario was programmed in such a way that the GUI announced "voice verification successful" after approximately 6 seconds from the demand for verification. To avoid that the participants discovered the simulation, they were reminded by the test supervisor if they did not say their password soon enough.

After some time the road led to a town and the test supervisor trigged the second automatic verification while driving, which was similar to the first one recently described above. If the system did not succeed with the verification the driver was informed about the failure and asked to verify his identity using fingerprints instead. In case that verification would have failed too the driver would have been told to dial his PIN.

The participant continued driving whereupon the test supervisor trigged the last verification procedure, voice verification while driving. Shortly after this verification the driver was asked to pull over and stop the vehicle.

Follow-Up Interview

After the test the driver was shown back into the conference room to be interviewed again. The second interview treated the driver's experience of the test in its entirety, pointing out each verification method, the GUI and the scenario.

The driver was asked about his experiences of the first initial verification and the verifications while driving (fingerprint scanning and voice recognition respectively). If the automatic verifications had been successful the driver was informed about their existence. He was encouraged to share his opinions on the use of such methods and about the idea of having to do another kind of verification in case the automatic one had failed. The drivers who had not been successfully verified by the automatic verification were asked about their experiences of having to do yet another kind of verification while driving. They too were encouraged to share their opinions on having an automatic verification while driving. To enable comparisons of the different methods and verifications that had occurred in the test, the driver received the same questions for each occasion respectively. Repeated questions were to grade (from 1 to 5) if the verification/method was complicated or easy, time consuming or fast, strange or reasonable, boring or amusing, uninteresting or interesting and unnecessary or necessary.

The driver was interrogated about his thoughts around security and the implementation of a verification system in a vehicle. He was encouraged to share his thoughts about it before the test, and after, to see if the test had changed his opinion. Before the session was over the driver was asked if he wanted to add anything, if something was missing in the test or if he had any questions.

Results from the Tests

This section begins with an introduction of the test participants. Afterwards the results from the first interview, the simulator test and the detailed interview that followed the simulator test will be presented. All interviews were held in Swedish, thus the quotations presented here are the authors translations.

The average age of the participants was 41 years old, with a standard deviation of eleven years. The youngest participant was 23 and the oldest 60 years old. The participants had worked as truck drivers for an average of 18 years, spanning from three to forty. Four of the drivers drove purely long haul, six of the drivers drove mainly in the local area of Gothenburg and the remaining eight drove mixed haulages.

Results from the First Interview

On the question what "security" meant for them most drivers talked about safe vehicles. When the question was specified to security against criminal actions most drivers talked about the gas alarm that many long haul drivers have in their cars. All drivers said that they felt safe at work, except for one who scored neither safe nor unsafe. The average score was 4.78 with a standard deviation of 0.55. The surroundings or the area where one is driving might affect the feeling of safety according to ten of the drivers. Three of them thought that time also was a factor together with the surroundings. According to three of the drivers there are other things that affect their feeling of safety, for instance what kind of cargo they are carrying. Two of the drivers felt safe no matter what and did not see any factors that affected that feeling of safety.

All except one used a card at work to get access to specific items or areas. The one that did not use any card used a PIN to get his access. Eight of the drivers used both cards and PINS.

Eleven of the drivers shared their vehicle with one, or more, other driver(s). The others had their own personal vehicle, but some of them said that in case of disease others might drive the vehicle and it also occurred that they lent their vehicle to someone else.

Merely two drivers could mention biometric methods without any assistance from the interviewer. Two could not come up with any other method even though they were given fingerprint verification as an example. Nevertheless three drivers had been verified/identified with biometric methods and none of them had had anything against it. The ones who had never used any biometrics scored on average 4.20 on a scale from 1 (negative) to 5 (positive), with the standard deviation of 1.42. Among them eleven were positive and all of them scored 5. One driver scored 1, two scored two and the last one scored 3, as in neither negative nor positive.

When asked about possible drawbacks for the use of biometric verification methods six drivers could see risks. On the other hand two of those drivers could also see possibilities or advantages for biometrics. Ten drivers could see only advantages and possibilities. The remaining two had no answers to the questions.

Results from the Test Scenario

The system worked well throughout the 18 tests. This section will briefly discuss the result. It should be noted that the results merely discuss how often the participants succeeded with passing the verification. The authors have tested the system briefly for false acceptance. Not a single occasion has occurred.

The Initial Verification

The initial verification comprised all the implemented verifications methods. At least one of the methods succeeded for all the participants thus all was approved to start the engine.

All 18 participants succeeded with the PIN-verification. One dialed the wrong code once, but succeeded on his second attempt.

The fingerprint verification was successful for 14 participants. One of these 14 participants needed more than one attempt. Some of the participants were guided where to put the thumb if system failed to find the print. (As described hereinabove with respect to theory, it is a common problem that the finger is not placed correctly.)

One single attempt was enough for a successful face recognition for 11 of the participants. All in all the face recognition succeeded for 16 participants.

The voice recognition was simulated and thus all participants passed, even though some of them needed to be reminded of what to say.

One of the participants were not verified by neither the fingerprint verification nor the face recognition, but was approved since the PIN had been correct. Two of the other participants were not either verified by the fingerprint verification. In those cases the face recognition required two attempts before successful verifications were achieved. Either the face verification or the fingerprint verification caused problems while verifying three of the remaining participants, nevertheless all of them were successfully verified since all methods could be tried more than ones.

First Verification while Driving (Automatic Face Recognition)

The system automatically recognized 13 of the participants. Two of the ones that had not been automatically recognized had to dial their PIN since the fingerprint verification had failed as well.

Second Verification while Driving (Fingerprint Verification)

The fingerprint verification was successful for 13 of the drivers, among them 10 passed on their first attempts. The remaining passed the PIN-verification on their first try.

Results from the Acceptance Scale (During the Coffee Break)

Figure 18:
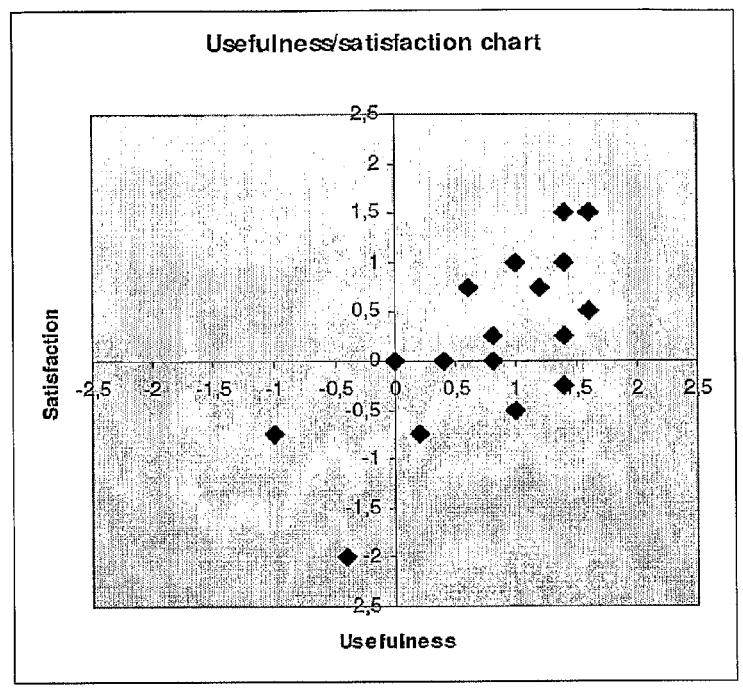
FIG. 18 a chart of each participant's average score regarding usefulness and satisfaction.

The inquiries that had been answered during the coffee break showed that the system was perceived as more useful than satisfying. See below for each participant's average score regarding usefulness and satisfaction (on the scale between −2 and +2). (See FIG. 18)

Since the scale is supposed to present five questions about the system's usefulness and four questions about the satisfaction, a calculation of the answers were made to see if the driver had scored similar on all the satisfaction questions and all the usefulness questions respectively. Cronbach's Alpha was used for this calculation. In this case the reliability statistics for the acceptance scale scored 0.787 for the usefulness and 0.698 for the satisfaction, which indicates that the drivers perceived the questions as intended.

The opinions varied among the participants since all questions had received at least one maximum grade and almost all of them had received at least one minimum grade. None of the drivers perceived the system as useless, but three scored it towards bad and three scored neither bad nor good. The usefulness scored on average 0.80 with a standard deviation of 0.72 and the satisfaction was scored with an average of 0.24 with a standard deviation of 0.89. Some of the drivers perceived the system as irritating. The verbal comments indicate that it was especially the verification while driving that arouse irritation. Thus the system does not please everyone, but there were more positive than negative answers.

Verification after the Short Break (Fingerprint/Voice Verification)

The first ten participants used fingerprint verification before starting the vehicle after the break. Nine of those ten were verified, eight of them on their first attempts. The participant that was not successfully verified had to dial his code to be authorized. The PIN verification succeeded on the first attempt.

The remaining eight participants used voice recognition. This verification was simulated so that all passed, even though some of the drivers had to be reminded by the test leader what to say.

Third Verification while Driving (Automatic Face Verification)

The automatic verification successfully verified 15 of the participants, 12 of them were verified on the first attempt. The following fingerprint verification succeeded on the first attempt for two of the remaining three participants. The third one had to dial his PIN since the fingerprint verification had failed s well. He was successfully verified by his PIN on the first attempt.

Fourth Verification while Driving (Voice Verification)

The fourth verification while driving was voice recognition and since it was simulated, all participants passed.

Results from the Follow-Up Interview

This interview asked specific questions about the different methods, as well as more general questions related to biometrics and verification methods. In addition the drivers were asked about the GUI and the sounds connected to it. All this is presented in this section and therefore it has been divided into different parts.

The First Response to the System

The first response from the drivers after the test was mainly positive. Nine of the drivers perceived the test as realistic. Seven of the drivers thought it to be a vision of the future. One driver found the test unrealistic and the remaining driver never gave a specified answer to the question.

The GUI and its Sounds

All drivers but one gave the highest score (5) to the GUI. This person gave it the grade 3, thus the GUI scored an average rank of 4.89. Twelve of the drivers had perceived the sounds connected to the GUI. "I even learned the differences between when it is correct and when it is wrong." said one driver. As an answer to the question whether it was good or bad to have sounds the drivers ranked it as an average of 4.5, with a standard deviation of 1.24. It seems like the drivers either liked or disliked the sounds since ten of the twelve drivers that had perceived the sounds scored either 1 or 5. The average score was 3.38, with the standard deviation 1.89, thus it is difficult to tell whether the sounds were helping or annoying.

The drivers handled the GUI on their own and spontaneously did what they were supposed to even though they had not been given any instructions beforehand. Sometimes they were eager to start and asked the test supervisor if they should stick in the card, before the GUI had started, but in these cases the first message usually showed before the test supervisor had had the time to answer. One person dialed wrong at the third digit, he then turned to the test supervisor: "I dialed the wring number, what should I do now?" The test supervisor encouraged him to try what he felt was the right thing to do, whereupon he instinctively used the right button to erase the wrong digit and continue as normal.

The Initial Verification

All drivers found the first verification, before starting the journey, to be easy. The average score for ease of use was 4.89 with the standard deviation of 0.32. (Two ranked 4, the rest ranked 5.) Ten of the drivers thought it reasonable to have this verification. One did not know whether it was reasonable or strange. The remaining seven thought it to be strange or a little strange. On the question of necessity the average score was 3.14 with the standard deviation of 1.80. With all the questions summarized this first verification received the average score 3.71, with the standard deviation of 0.68.

The Automatic Face Verification

When told that an automatic verification had been carried out using the camera, most drivers thought it to be a good idea. The drivers that were not verified by the camera and had to do the fingerprint verification thought it to be quite reasonable. Those who had been verified without knowing it were mostly positive to the idea that if it would have failed they would have had to go through a fingerprint verification.

One of the four who the system failed to verify was negative to the system. Regarding the others it is not possible to draw any conclusions from the correlation between the successful/failed verification and the driver's perception of the system. One of them did not mind neither the fact that the system had tried the automatic verification nor that he had to do other verifications as the system failed the automatic one. Yet another said that it was good if the system carried out the verification automatically, but if it did not succeed, it should alert the driver to sit correctly so that the verification could go through. The fourth person did not like any of the verifications while driving and thus did not like the automatic one either. "The less things that comes up during the ride, the better."

The Fingerprint Verification while Driving

The first verification while driving, when the drivers had to do a fingerprint scan was not perceived to be as easy as the first verification. The fingerprint verification while driving scored 3.19 as the average, with a standard deviation of 1.67. This verification leaned more towards being perceived as strange rather than reasonable. On the scale from 1 (strange) to 5 (reasonable) the fingerprint scanning while driving scored on average 2.94 with the standard deviation of 1.86. Whether this verification was necessary or not scored 3.11 with the standard deviation of 1.78. As an overall score this fingerprint verification while driving ranked 3.19 with the standard deviation of 0.38.

The Verification after the Break (Fingerprint/Voice)

After the coffee-break the first ten drivers verified themselves with their fingerprint, the other eight used voice verification. No matter which method they used all drivers scored this verification as easy. With the two methods together this verification scored 4.17 towards reasonable rather than strange, with the standard deviation of 1.50. The necessity was ranked as 3.78 with the standard deviation of 1.83. With all questions included and both methods added together this verification scored 4.12 with the standard deviation of 0.68.

The ones who used fingerprint verification after the break ranked it with an average of 4.60 towards reasonable, with the standard deviation of 0.97. The necessity was scored with the average of 4.40 with the standard deviation of 1.35. One person failed the fingerprint verification and thus had to dial his PIN too. He still scored 5 on both the ease of use as well as for finding the system reasonable, but he scored 3 on the necessity question.

The ones that had to do the voice verification after the break scored an average 3.63 with the standard deviation of 1.92 on the question whether this verification was strange (1) or reasonable (5). It is ranked as neither necessary nor unnecessary since the average on this question was 3.00 with the standard deviation of 2.14. Some of the driver's had to be reminded about the password. This was done only to avoid that the participants discovered that this verification was simulated.

The Voice Verification while Driving

The second verification while driving was simulated, hence it never failed, even though some drivers made small mistakes when saying the password. Some of the driver's that had not used the voice verification after the initial verification had to be reminded about the password. All drivers that had used voice verification after the break were quick to answer the system. This verification was perceived as easy since all the drivers scored 5, with no exceptions. On the question whether it was reasonable or strange to have this verification the average rank was 3.41 with the standard deviation of 1.84. It was regarded the least necessary verification since it scored an average of 2.71 with the standard deviation of 1.99. With all the questions summarized this verification scored 3.65, with the standard deviation of 1.08.

Generally about the Methods

When asked about the verification methods in general, how the drivers felt about using fingerprint, voice, face or code verification, the voice verification scored the highest average with 4.61 and the standard deviation of 0.66. Fingerprint and voice verification share the highest rank for trust. They both received 4.28 as the average score. Fingerprint had a standard deviation of 1.23 and voice of 1.27. The face verification scored an average of 3.67 and the code verification 3.72 in the question of trust. They had standard deviations of 1.61 and 1.60 respectively.

Some of the drivers did not like the placement of neither the fingerprint scanner nor the screen for the GUI. They did not want to take the eyes off from the road and suggested voice instructions instead and the GUI closer to the steering wheel or integrated in the instrument cluster. Another suggestion was to place the fingerprint on the right side of the driver seat.

At the end of the interview the drivers were encouraged to grade the tested verification methods in their preferential order; the most preferred as number one, the second as number two and so on. Half of the participants preferred fingerprint verification. Face recognition, voice recognition and PIN were preferred by three participants each. Regarding the average rank for this preferation score, fingerprint was the most popular and face recognition came second, even though voice recognition was not far behind. Only two drivers mentioned the card. One thought it to be the second best method after PIN but the other merely graded it last, after all the other methods. It is possible that the drivers did not perceive the card as a verification method since it was presented as their tachograph card, in that case it might explain why no one else mentioned it.

One of the participants believed the fingerprint verification to be the least reliable while he found the face recognition to be the best since he did not even notice it. Another participant preferred fingerprint even though he perceived it as the most difficult method to use. He acknowledged face recognition as the easiest method, but did not like it at all since he felt uncomfortable to have a camera in front of him.

Generally about Verification Issues

Ten of the drivers would like to have this kind of system in their vehicle. However, only two wanted all the methods, eight of the drivers thought it to be enough to have one verification method, one did not want any method at all and the remaining drivers had various recommendations of more than one method, but not all of them. The average number of methods desired in the system was 1.72 with the standard deviation of 1.32.

Five of those who before the test did not see any disadvantages to have biometric verifications did see disadvantages after the test. Four of those who saw disadvantages before the test answered differently after. One who could see advantages before the test did not see it afterwards. Five drivers could see advantages after the test that they did not see before.

Figure 19:
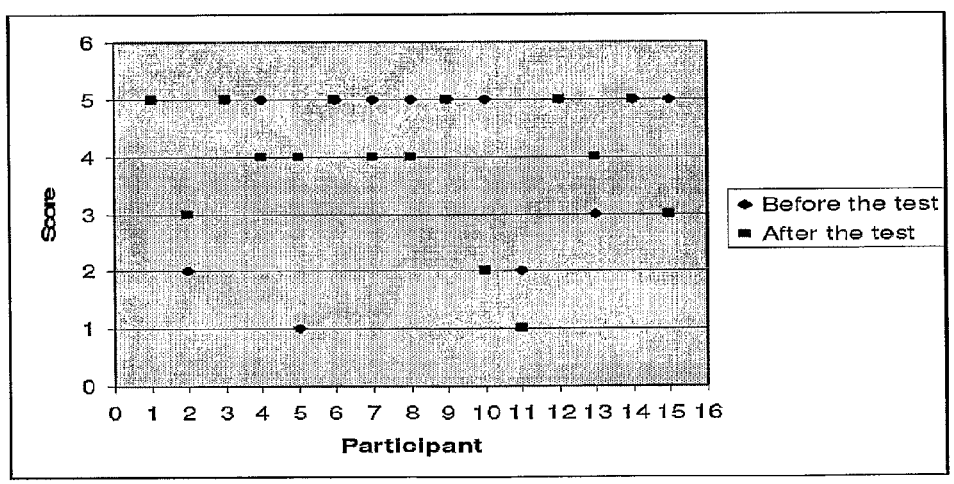
FIG. 19 a chart with answers of participants before and after the test.

The 15 participants who had never used biometrics before this test were asked in the first interview if they were positive (5) or negative (1) to biometric verification methods. After the simulator test they were asked again about what they thought of biometric verification methods now, after the test. Six of the participants scored more negative after the test than before, three participants scored more positive and six participants scored equally as before. These answers are presented in the diagram below. (See FIG. 19)

Regarding their score eleven of those 15 drivers were positive to biometrics (scoring 4-5), two of them were negative (scoring 1-2) and two were neither positive nor negative (scoring 3).

Notable is that several of the participants said themselves to be more positive after the test than before, even though they did not give a higher grade than the previous one.

Since the participants were requested after the test to tell what they had scored before, it is assumed that some of them said themselves to have ranked lower before than what they had actually done.

Four of all participants were more positive to have biometrics in the vehicle than in other situations. Four others thought the opposite, that biometrics are OK, but not in the vehicle. The remaining drivers scored equally for biometrics in the vehicle and biometrics in general. As an average score a verification system in the vehicle received 3.78 with the standard deviation of 1.35. Biometrics in general scored in average 3.76 with the standard deviation of 1.48.

Several drivers were positive to the idea of a verification system in the vehicles, but said that they had no need for it in their daily work. The fact that they themselves had not been exposed to any crimes or attacks was a frequent commentary from the drivers. They thought it might be easier to answer the interview questions if they had been forced to think about these issues. As they felt safe at work they said it to be hard for them to relate to the problems. 4.3 General technical results.

This section illuminates some observations made during the tests, regarding the technology.

The Fingerprint Verification System

The fingerprint system worked well throughout the tests. On a few occasions the system became non-responsive, but this is more likely to depend on problems with the COM-port on the main PC than the BioCorell-system. No participants failed the enrollment phase, even if sometimes several tries were needed in order to retrieve a sufficiently good image. All participants succeeded at least once with verifying themselves using their fingerprint.

The Face Verification System

The face verification system had a more stable behavior than the one for fingerprint verification. No participants failed the face enrollment. However one of the participants could not be enrolled until he had taken off his baseball cap. It is possible that the cap cast shadows over his face that complicated for the system.

Some problems with glasses occurred as well. This since reflections in the glasses can make them opaque to the camera. At one occasion the enrollment phase had to be repeated since the face recognition did not succeed to locate the position of the eyes of the driver. This driver wore glasses and was also the only one to fail all three face verifications during the test.

The Voice Recognition System

The voice recognition was only simulated during the tests and therefore it is not possible to say anything about the functionality of the system.

Analysis and Summary of the Results

The participants were more positive than negative to the verification system and were mainly positive to the idea of using biometric verification in their vehicles. The fingerprint verification was, as mentioned, the one that most participants preferred and it also scored the highest average grade. It was also the method that most participants knew. Those who could give more examples said that they had seen things in movies and talked about eye scanning and face/voice recognition, nevertheless it seemed like even those who could mention other methods perceived those methods as futuristic. It is possible that the futuristic feeling did influence their choice of preferred method.

Several participants were positive to the face recognition but it must not be forgotten that others felt controlled by the system and did not like the camera. One driver said: "I like the freedom that comes with this job. As long as I get the things done, that should be done, I can do it the way I like, it's no one else's business. With this system I felt like I was no longer the one in control. It was the system that told me when I could drive or not." That participant and yet another one said that they would consider changing job if a driver verification was legislated. The remaining participants were not so drastic, but commented that they were unaccustomed to use it system like this one. Training opportunities and information might enhance the positive reception of the system.

Another example of when information is important to achieve acceptance is that several participants questioned the need for verification while driving. However, when the test leader and the participant talked about it after the interviews and the participant asked about the verification while driving, the test leader gave this example: "Imagine a truck driver who has been verified and has started the engine when he sees a wire that needs to be attached to the cargo. When the driver leaves the coupe to fix the wire an impostor might take his place and try to leave with the vehicle." The participants said it was something they had not thought about before, but said that it happened that they jumped out after starting the vehicle. With the explanation for why the driver should be verified while driving, the participants perceived it as reasonable, even though they did not want to be disturbed by a fingerprint verification. Face or voice recognition were more appreciated while driving.

A verification system in commercial vehicles should be developed with respect to the users' privacy. If so, it will probably be well received since most participants were positive to the idea.

Conclusions

The system that has been tested is a prototype and the system is not stable enough for use in real life. With verification methods specially adapted for automotive purposes, combined with an embedded control system instead of the both computers, it is probable that a stable, secure and robust system can be achieved. Automatic verification while driving is recommended, however if the problems with the lighting sensitivity remains voice recognition seems to be the second best. This since voice recognition does not require a lot of attention from the driver, but the method has to be tested before it is possible to say if it really is suitable for in-vehicle use.

PIN verification is a method that is suitable from a technical perspective but most of the users preferred biometric verification since the PIN is yet another code to remember. The method worked reasonably well while standing still, but it is not suggested to use it while driving since some of these drivers almost lost control over the vehicle while dialing the code. The same goes for fingerprint scanning, something that the drivers themselves commented.

As mentioned in the results, some of the drivers did not like this placement of the fingerprint scanner, but besides from that, this verification method is fast and reliable. If the users receive training, it is highly probable that it would be suitable for the purpose to verify the truck driver. Dirty hands are not supposed to cause any troubles, since all participants were enrolled and verified even though most of them arrived to the test directly from work (thus an authentic situation for the finger scanning as it is similar to if they would have entered their own vehicles). The scanner should be placed so that it is easy to scan any of the fingers on the right hand, instead of as it was now, when only the thumb could be used for verification. A bigger scanner, preferably with guidings for the finger to find the right position, would facilitate the verification for the users. Even though the fingerprint verification was preferred among the test participants it should not be the only method in a verification system since not everyone have fingerprints distinct enough for scanning.

The face recognition technology is not yet mature for these types of applications since it is too light sensitive. However, the face verification scored high and the main part of the drivers was positive to the automatic verification. This indicates that the face verification is preferred, seen from user perspectives. It would be important to assure the drivers that they were not constantly under surveillance, since some of the drivers felt uncomfortable facing a camera during the entire ride. How this balance between the control of the driver and his privacy should be found is yet left to investigate further.

Several of the driver's were positive to the voice recognition system, but since it was simulated to succeed at all times it is not possible to draw any conclusions on how it would actually suit in the truck context. Especially since many drivers did not trust it in the beginning due to bad experiences with similar voice recognition systems, this faked verification gave them a false trust.

The drivers' perceptions of whether the GUI sounds were helping or just annoying varied greatly. It is therefore suggested that the user should be able turn on/off the sound.

The worst skepticism among the interrogated haulage contractors was against the technology. "What if it fails?" was a common question. Most of them could also see troubles if something happens to the driver, an accident, or something else, that disables him to move the vehicle. "There must be a way to move the vehicle anyway." Also the test participants emphasized the importance of a solution for moving the vehicle in case of accidents. Additionally the test participants demanded for possibilities to switch a vehicle's driver with short notice. Possible solutions to these problems are discussed in section 6.10, Automotive aspects.

To sum up the results, it is considered to be possible to create a verification system suitable for an automotive environment. Still, it must not be forgotten that it is almost impossible to erase all risks. IRA for example solely uses people who are unknown to authority for any major operations. A tactic that is common in many terrorist attacks, whether it is a suicide bomber or a highjacker of a plane. Yet another example is that several of the terrorists performing the attack against World Trade Center used their own identities. Therefore, even though all drivers would be verified, it would be impossible to assure that their vehicles would never be used in any terrorist actions. There are numerous of examples of when the unwanted occurs despite the precautions taken. Nevertheless, a verification system in a truck would probably intimidate impostors and terrorists, which would benefit both the driver and the haulage constructor and in the long run the entire society.

Future Studies

The findings discussed herein give a lot of inspiration to look further into many different aspects of the idea and the possibilities with driver verification. Many questions have arisen during the work process, but it was not possible within reasonable time to answer them all within this application. This simulated system and the interviews gave an idea of the drivers' opinions, nevertheless it is important to test the system under more authentic conditions. Thus for future studies it is suggested to implement the system into a real truck and test it. Below is a list of different questions at issue that also must be considered.

Fingerprint Verification

Since some drivers were uncomfortable with the placement of the sensor, it would be interesting to find a better placement.

The system must be tested under authentic conditions in order to investigate how dirt, scars, calluses etcetera affects the performance of the system.

Face Recognition

For future studies it is suggested to mount the system in a real truck and test it under authentic conditions. During the test, the driver should be filmed and the light conditions in the coupe should be measured in order to test under which circumstances the system is functional. These tests should be complemented with deep interviews with the users to see how it fits them to have a camera inside the coupe. This is an important issue since some of the drivers were uncomfortable having the camera facing them during the test, while others did not bother at all and were very pleased with the idea of the automatic verification. Such a system might need restrictions for how they can be used, thus it might be necessary to create new laws for these circumstances of camera surveillance.

When thermography becomes more developed it should be considered to use this method in the verification system. The method would then need to be tested during different circumstances at shifting times of the day, preferably in a real truck.

On the border between the visible and the infrared wavelength intervals, the so called NIR-interval can be found. The problem with facial thermography is that there are no viable verification system available on the market, it can be problematic to use regular face recognition since it is sensitive to light conditions. By using a NIR-camera it might be possible to solve both these problems, since the face of the driver can be illuminated with NIR-diodes, invisible to him but not to the camera.

Voice Recognition

First of all it is desirable to test a working voice verification system. If the results are satisfying, the system should be tested for robustness in a real truck. This since the noise level in the simulator does not vary particularly. Noise can often be removed by filtering and the VoiceKey-system does adapt (within reasonable limits) to the actual noise level. But it must be tested if the noise variations in a real truck are within these limits.

Since it might feel awkward for the driver to talk loud straight out in the air, it might be necessary to implement a microphone near the driver seat. If the microphone is equipped with a powerswitch the drivers can feel that they are in control of when the system can "hear" them. Besides the awkward feeling that some drivers mentioned during the test, it seems to be a suitable method to use while driving. If the instructions were given auditorially too it might feel more natural for the driver to carry out the voice verification as it would be more of a conversation between him and the system.

It would be interesting to implement a GUI with only the pictures and the sounds, together with spoken instructions from the system instead of the text that was used in this prototype. It should be possible for the driver to turn off/on the voice instructions and the sounds so that each individual could have the system which suits him best.

Suitable Actions in Different Situations

What should happen when the driver has verified his identity? There are several possible scenarios regarding the verification and the events that follow and these are discussed more in the use cases hereinbelow.

An issue that has to be considered and discussed is; what should happen if the verification does not succeed at all? Considering the initial verification (before starting the engine), there are mainly four possibilities:

the vehicle is impossible to start;
the vehicle is possible to start and drive off as usual, but after some distance it slows down to walking speed with no further possibilities of increase in velocity;
the vehicle is able to start and drive as usual, but a warning is sent to the owner, leaving it up to him to take the appropriate precautions;
the failed verification is logged on board the vehicle, but no further action is taken.

It is always difficult to weigh the different situations against each other. If the vehicle moves even if the driver is not the appropriate one, or not even an authorized driver, the risk that the vehicle might be used for unwanted purposes increases.

Still, if it is impossible to move a vehicle without an authorized driver the risk for highjacking vehicles with the driver in it increases. Whether the society or the driver should have the highest priority might alter depending on the kind of cargo the vehicle is carrying and also where the vehicle is situated at the moment of the failed verification.

What should be done if the driver fails to verify his identity during the ride? This question has also been discussed during this process but to get some adequate answers several tests must be conducted. The possibilities are quite the same as the bullet points above with the modification that in the first two examples the vehicle stops or slows down to walking speed respectively.

When should the Verification Take Place

When to demand verification is also an important issue. If the imagination is allowed to run freely there are unlimited possible scenarios and somewhere the line has to be drawn. The authors suggest that the driver must verify his identity anew when the doors have been opened and the seat sensor reports that someone has taken the driver seat. The seat sensor is the one trigging the fasten seat belt~signal and most trucks have sensors checking if the doors are properly closed so this should be fairly easy to implement.

If it is desired to verify driver identity while driving, how often should that be done? In our inquiries, long haul drivers have told us that they sometimes drive for the maximum 4.5 hours in a row and sometimes it is eight stops on a two hour trip. The time or distance driven between the stops must be considered, weighing security and convenience against each other.

It is suggested that the demand for verification should not be raised too often since this might be disturbing for the driver. Moreover, if the driver stops for loading/unloading, it is highly probable that he steps out of the vehicle and if so, verification must take place before leaving again.

The ideal would be if verification while driving could be performed with no action taken from the driver, as in the case with automatic face recognition. But then as well, the verification should not be raised too often, due to the fact that if the automatic verification fails, the driver must be verified some other way.

Additional Possibilities

It is possible to have even more security levels than those that were made for this prototype. If the verification system has information about the cargo and in what geographic area the vehicle is operating, the system can adjust the level of security automatically. For instance, a gold transport in Cape Town demands a higher security level than when delivering gravel to a building site in a Laplander forest.

As suggested in the use cases, a multi-modal system can require only one biometric method for verification. Which method that is required is selected randomly so that the driver needs to have them all enrolled, but only use one at a time. With this randomization an impostor can not be sure of what he needs for verification and he will have a lot of work to prepare a fake sample of all the different characteristics.

Another benefit when the different methods are randomly tested is that the driver's habituation will be better than if he only used one all the time and then suddenly has to switch, due to the loss of a finger or something less drastic.

This would also give the possibility to update one template in the database if the verification was a total success. To illustrate an example; imagine that the driver recently has been verified using his card, the PIN and his fingerprint. If then all these methods succeeded the system might take a new photo of the face to update the register. This can facilitate the verification if a driver is for instance growing beard or have just shaved, or if the driver has gained or lost weight since the enrollment.

An idea that came up at this stage was to combine hand geometry with fingerprint scanning. The resolution of the digital cameras of today is high enough to take a sufficiently detailed image of the palm, in order to analyze both finger measurements as well as fingerprints.

Database Placement and System Administration

Since all methods described require a database to store the original templates that are created during the enrollment process, studies regarding the placement of the database must be carried out. This database is needed for the comparison during the verification. In the prototype the database was stored on a computer next to the cabin; in reality there are basically three different placements to consider; back office; in-vehicle; smart card.

Which placement that is the best depends on several parameters and has to be considered from case to case. One thing is clear though, if the system is used to prevent unauthorized people from starting the vehicle, the communication between the biometric device and the database must never fail. This since otherwise, an authorized driver may be stuck in the middle of nowhere due to communication problems between the vehicle and the database.

Back-Office Placement

Back office placement means that the template database is placed in a computer at for instance the haulage contractor's office.

A verification system might need real-time update and hence a link between the vehicle and the database is required. If a driver is ill and someone else takes that assignment the system must be updated to accept the new driver as the appropriate one. As mentioned earlier, the US government wants to avoid that people in FBI's databases drive trucks carrying hazardous goods. The FBI's database changes, thus real-time update for the verification system would be desired.

In-Vehicle Placement

In-vehicle placement is when the templates are placed on a computer in the truck. This limits the problems caused by the wireless communication, but instead the protection against theft or system hacking will not be as strong as with back office placement. It is the simplest solution, but also probably the most expensive since it demands one database in each vehicle.

Smart Card-Placement

Smart card placement refers to when the templates are stored on a smart card, which the driver can take with him when leaving the vehicle. This increases the security since the driver also needs to bring the smart card to pass the system. Besides, the fact that the driver himself carries his biometric templates may increase his feeling of privacy.

One benefit if the database is kept either on a card or at the back office is that it is not bound to a specific vehicle. If a driver needs to switch vehicle due to engine failure etcetera it will not be a problem since all drivers can drive all vehicles as long as they carry their own smart card and are registered in the database. Note that a dynamic update of the database will be very important.

From the 5 Aug. 2005 all new vehicles, within the entire EU, must be equipped with a digital tachograph. Today's tachographs are simple paper discs and it is not unusual that the data is manipulated. The digital tachograph is a smart card that automatically registers data, such as speed and driving time between stops. The smart card makes it much more complicated for the drivers to manipulate the registered data and in the long run the digital tachograph is intended to be standard for all vehicles. The digital tachograph opens up possibilities for integration with the biometric smart card that can be used for the templates. That way, the driver only needs one card, but both the vehicle parameters and the templates for verification will be stored together. This might be a way to increase the security even further as it will be assured that the data from the tachograph belongs to the driver (assuming that he has been verified).

If the driver loses his card it opens up the possibility for an impostor to enroll himself and save his templates on the card. This will however be difficult since he will not only need to know which methods are used. He must also know the structure of the templates and be able to get past the encryption embedded on the card. In order to store something on the card he must also have knowledge of the operating system of that specific card. The operating systems vary greatly from manufacturer to manufacturer.

System Administration

Related to the discussion about database placement are reflections on how to administrate the system. Some haulage contractors have a large number of vehicles and drivers and if the system is ungainly to administrate they might be forced to recruit additional staff just to administrate the verification system. In that sense, in-vehicle placement of the database is not suggested. This since each driver must either be enrolled in each vehicle that he should drive, or his templates must be downloaded to the database in those vehicles.

With back-office placement of the template database, one alternative would be to download the templates temporarily to a memory in the vehicle in order to do the matching. The other alternative is to send the templates scanned during verification to the back-office for matching. This is not suggested due to the risk that the vehicle enters an area with insufficient reception, or the possibility that the wireless connection is bugged. Even if it is said that it should be impossible to recreate the actual characteristics from the template, it might be uncomfortable for the user to know that his biometric templates are sent away.

If the templates are stored on a card, for instance the digital tachograph card these problems do not occur. Instead there is a risk that the driver looses his card. However, it is prohibited to drive the vehicle without the tachograph card inserted and therefore it is probable that the drivers will take good care of their cards.

Telematics

To enable the system to communicate with the back-office, telematics are required. Most trucks of today are equipped with some kind of communication system. It can be anything from basic analogue radio communication to advanced systems. Since focus of this thesis is the verification system itself, it is simply assumed that it is possible to transfer data between the truck and the office.

It is suggested to send name, employment ID and information about the outcome of the different verifications to the back-office. The risk for a bugged connection suggests that neither the templates nor too much information about the driver (for instance social security number) should be sent.

Another recommendation, due to the risk for a bugged connection, is to send the information in an encrypted fashion to reduce the risk of information slipping into the wrong hands. There are numerous products on the market for data encryption. Most systems process the data according to an encryption key. The data is then sent to the receiver who has an identical encryption key to decode the information.

Information Distribution

Where should the data be sent and to whom? The owner of the truck owns the information but there are other actors who might want to take part of it. Such actors can for instance be the insurance companies, the national road association, the police and the fire and rescue service. Whose responsibility it should be to update, store and distribute the information must be considered.

Important Automotive Aspects

There are a number of complicating scenarios that can occur due to the automotive perspective, for instance:

If the vehicle is used for rental, it must be easy to enroll as well as remove people from the system. A benefit can be that the rental company can make sure the vehicle is only driven by the person enrolled at the sales counter.

If the vehicle is lent to someone, an easy bypass or enrollment/removal procedure is required.

If the vehicle is in need of workshop service, there must be a simple way of bypassing the system instead of enrolling the mechanics at the workshop. A possible solution might be to allow the truck to move at for instance 5 km/h without the tachograph card or any other verification.

If the driver is hurt or in any other way incapable of driving the vehicle, there must be a way to move it in case of emergency. The solution might be as suggested in the previous bullet point.

If the vehicle is sold to someone without the need for the verification system, it must be possible to remove it.

The handling of the vehicle during manufacture or transport is also a problem to consider. This can be solved in a similar way as during workshop service.

These aspects must be considered thoroughly before letting the system out on the market. Also if the biometric system is to replace the ignition key for engine start, the way to handle electrical supply, engine start and steering lock must be looked upon.

Method Criticism

In the first driver inquiry the documents were distributed at a truck stop. The drivers were asked if they could answer some questions about their work and the possibilities for a driver verification system. There is a risk that only those who were strongly against it or very positive wanted to answer while the rest did not care enough to take the time to answer the questions.

The same goes for the documents that were distributed at a haulage constructor in Gothenburg. Only half of the distributed documents were returned, which leads to the questions; who chose to answer/not to answer, and why? These documents were left with an instruction to an employee at the office. If there were any questions the drivers had no one to ask about further information/explanations.

The selection of both methods and equipment was limited by lack of time as well as funding, it is therefore uncertain if the equipment used is the best systems available. Furthermore, the software was implemented by a relatively inexperienced programmer and this may have affected the performance of the system.

The simulator was, as previously stated, not perfectly suited for the scenario and due to lack of time it was not possible to do any adjustments. Some of the participants had comments regarding its behavior. This may have affected their judgments about the verification system. The outcome of the testing had probably been more correct if the simulator had been more authentic.

The scenario was rather intensive with six verifications in about 30 minutes. It would have been better to have a longer test, but this was not possible due to the limitations in time.

It is possible that the drivers who chose to participate in the test are particularly interested in new technology and therefore more positive than the average truck driver. It is possible that all participants did not get exactly the same information during the enrollment phase and this might have affected their behavior.

During the enrollment, the participants were asked to lower the steering wheel in order to get a clear shot with the face recognition camera. During the test, some of them raised the steering wheel again while driving. It was not possible to abort the test at that time. This might have affected the performance of the face verification system.

Many words and abbreviations used in this application may be unknown to the reader and therefore we list the most commonly occurring.

| | |
|---|---|
| Anthropometiy | The study of human body measurement for use in (anthropological) classification and comparison. |
| Automotive | A generic term for technology connected to the vehicle industry. |
| Biometric | A generic term for methods using analysis of the subject's unique body characteristics. |
| Dielectric | Dielectrics are isolating materials with various properties. |
| ECG | Short for Electrocardiogram. Measurement of electrical signals in the heart. |
| FAR | Short for False Authentication Rate. Indicates how often the system takes an impostor for an authorized user. FAR and FRR (see below) are strongly correlated; High FAR implies low FRR and vice versa. |
| Forensic | Generic term used for things associated with investigations for crime and justice |
| FRR | Short for False Rejection Rate. Indicates how often the system rejects an authorized user. FRR and FAR (see above) are strongly correlated; High FRR implies low FAR and vice versa. |
| IR | Short for Infrared. Light with longer wavelength than visible red light, hence invisible to the human eye. |
| Minutiae | Special features of a fingerprint, for instance where ridges end or split in two. |
| Mock-up | Parts, typically driver environment, of a vehicle put in a lab for simulation and testing purposes. |
| NIR | Short for Near Infrared. |
| Oximetry | Pulse oximetry is a simple non-invasive method of monitoring the percentage of haemoglobin (Hb) that is saturated with oxygen. |
| Permittivity | A measure of how much a medium changes to absorb energy when subject to an electric field. |
| PIN | Short for Personal Identification Number. |
| Ridge | The outstanding lines of a fingerprint. |
| Smart card | A tiny secure crypto processor embedded within a credit card-sized or smaller card. An example is SIM-cards for GSM cellular phones. |
| TER | Short for Total Error Rate, the sum of FAR and FRR. |
| Thermography | Measurement of heat differences using an IR-camera |
| Valley | The sinks between the ridges of a fingerprint. |

| SWOT ANALYSIS TABLES | |
|---|---|
| FIG. 20 | Fingerprints as method of verification. |
| FIG. 21 | Iris scanning as method of verification |
| FIG. 22 | Voice verification as method of verification |
| FIG. 23 | Face recognition as method of verification |
| FIG. 24 | Facial thermography as method of verification |
| FIG. 25 | Retinal scanning as method of verification |
| FIG. 26 | Lip movement scanning as method of verification |
| FIG. 27 | Hand geometry recognition as method of verification |
| FIG. 28 | Passwords and PIN's scanning as method of verification |
| FIG. 29 | Cards as method of verification |
| FIG. 30 | RFID as method of verification |
| FIG. 31 | Statistics from van der Laans Acceptance Scale |

| MULTIMODAL VERIFICATION USING ALL BIOMETRIC METHODS | |
|---|---|
| Use case: | Multimodal verification at the highest security level (all biometric methods) |
| Reference: | |
| Purpose: | Verification is done to assure that the driver is the appropriate one. The driver uses all the available biometric methods for verification because the vehicle is classified with the highest security level. |
| Actors: | the Verification system, the Driver, the Back-office |
| Preconditions: | The vehicle is locked, or recently unlocked. |

Main Flow of Events

A driver enters the vehicle and turns the key whereupon the system demands for verification using several methods to assure that this is the appropriate driver. The driver starts by verifying himself with one of the methods, then he continues with the next, and the next, until the verification is completed. When the driver is verified the information is sent, encrypted, to the back-office and the driver can drive away with the vehicle.

Alternative Flow of Events

A driver enters the vehicle and turns the key, whereupon the system demands for verification using several methods to assure that it is the appropriate driver. The driver does not succeed with one or more of the verification methods. After three failures with a method the verification continues with the other methods (or ends without the last one if that is the one to fail). At least one of the methods succeeds and the information is sent, encrypted, to the back-office, and the driver can drive away with the vehicle. Together with the verified information about the driver, the back-office also receives information about the failed verification.

Alternative Flow of Events

A driver enters the vehicle and turns the key whereupon the system demands for verification using several methods to assure that it is the appropriate driver. The driver does not succeed with the first verification method, after three failures the system continues with the next method. None of the methods succeed, whereupon a warning is immediately sent to the back-office.

Special Requirement

The system should receive information when a person unlocks the doors. The system needs telematics to be able to send the information between the vehicle and the back-office.

EXAMPLE 1

The driver has arrived at the garage to start the working day. As he enters the vehicle he inserts his smart card (integrated in the card for the tachograph) in the reader, dials his PIN-code and then places his finger on the scanner. The PIN is correct and the finger is verified against the card, so the system asks for a voice sample. The driver says his password in the microphone. A system message appears, telling the driver to sit in a normal driving position, in order to perform the face verification. Recorded data is analyzed and compared to the template data stored on the smart card—the verification was successful. The name and employment identification number are sent, encrypted, to the back-office.

EXAMPLE 2

The driver has arrived at the garage to start the working day. As he enters the vehicle he inserts his smart card (integrated in the card for the tachograph) in the reader, dials his PIN-code and places his finger on the scanner. He tries to verify his identity by his voice, but it fails as he has got a cold today. A sign informs the driver about the failed verification. The procedure continues with succeeded face verification. The name and employment identification number are sent, encrypted, to the back-office, together with information about the failed voice identification.

EXAMPLE 3

On a long haul trip the driver takes a nap in the coupe. As he wakes up he goes outside to stretch out his legs before continuing his journey. The passenger door opens and an impostor climbs in and takes the driver seat. The impostor tries to start the vehicle but does not succeed with the verification, thus the vehicle is immobilized. A warning is immediately sent to the back-office, and the system takes a picture of the person behind the steering wheel. This picture is also sent to the back-office.

| MULTIMODAL VERIFICATION USING TWO BIOMETRIC METHODS | |
|---|---|
| Use case: | Multimodal verification at medium security level (two biometric features) |
| Reference: | |
| Purpose: | Verification is done to assure that the driver is the appropriate one. To accommodate to the classification of the vehicle, medium security level, the driver verifies his identity using two biometric features. |
| Actors: | the Verification system, the Driver, the Back-office |
| Preconditions: | The vehicle is locked, or recently unlocked. |

Main Flow of Events

A driver enters the vehicle and turns the key whereupon the system demands for verification using several methods to assure that this is the appropriate driver. The driver starts by verifying himself with one of the methods, then he continues with the next, and the next, until the verification is completed. When the driver is verified the information is sent, encrypted, to the back-office and the driver can drive away with the vehicle.

Alternative Flow of Events

A driver enters the vehicle and turns the key, whereupon the system demands for verification using several methods to assure that it is the appropriate driver. The driver does not succeed with one or more of the verification methods. After three failures with a method the verification continues with the other methods (or ends without the last one if that is the one to fail). At least one of the methods succeeds and the information is sent, encrypted, to the back-office, and the driver can drive away with the vehicle. Together with the verified information about the driver, the back-office also receives information about the failed verification.

Alternative Flow of Events

A driver enters the vehicle and turns the key whereupon the system demands for verification using several methods to assure that it is the appropriate driver. The driver does not succeed with the first verification method, after three failures the system continues with the next method. None of the methods succeed, whereupon a warning is immediately sent to the back-office.

Special Requirement

The system should receive information when a person unlocks the doors. The system needs telematics to be able to send the information between the vehicle and the back-office.

EXAMPLE 1

The driver has arrived at the garage to start the working day. As he enters the vehicle he inserts his smart card (integrated in the card for the tachograph) in the reader, dials his PIN-code and then places his finger on the scanner. The PIN is correct and the finger is verified against the card. The system asks for a voice sample so the driver says his password in the microphone. Recorded data is analyzed and compared to the template data stored on the smart card—the verification was successful. The name and employment identification number are sent, encrypted, to the back-office.

EXAMPLE 2

The driver has arrived at the garage to start the working day. As he enters the vehicle he inserts his smart card (integrated in the card for the tachograph) in the reader, dials his PIN-code and then places his finger on the scanner. The PIN is correct and the finger is verified against the card. A system message appears telling the driver to sit in a normal driving position, in order to perform the face verification. Recorded data is analyzed and compared to the template data stored on the smart card—the verification was successful. The name and employment identification number are sent, encrypted, to the back-office.

EXAMPLE 3

The driver has arrived at the garage to start the working day. As he enters the vehicle he inserts his smart card (integrated in the card for the tachograph) in the reader, dials his PIN-code and places his finger on the scanner. He tries to verify his identity by his voice, but it fails as he has got a cold today. The name and employment identification number are sent, encrypted, to the back-office, together with information about the failed voice verification.

EXAMPLE 4

The driver has arrived at the garage to start the working day. As he enters the vehicle he inserts his smart card (integrated in the card for the tachograph) in the reader, dials his PIN-code and places his finger on the scanner. A picture is taken of the driver's face, but as he has been growing a beard during his vacation the verification fails. The name and employment identification number are sent, encrypted, to the back-office, together with information about the failed face verification.

Exemplary implementations of the presently disclosed invention(s) is described hereinabove. Those features for which patent protection is being solicited are recited in the following claims.

What is claimed is:

1. A method for assuring that the operator of a vehicle is an authorized driver, the method comprising:
    utilizing an onboard, multi-mode driver verification system to ascertain whether an operator is an authorized driver;
    performing a first driver verification procedure on a present operator of the vehicle and determining whether the present operator is an authorized or unauthorized driver of the vehicle;
    performing a second driver verification procedure on the present operator of the vehicle and determining whether the present operator is an authorized or unauthorized driver of the vehicle, wherein the first and second driver verification procedures are performed with a time interval therebetween, the time interval being dependent upon the nature of the work being performed by the operator and upon one or more of a frequency of vehicle stops and a frequency of times the operator enters into and exits from the vehicle;

exercising a remedial measure to avert potentially negative impact when the present operator of the vehicle is determined to be an unauthorized driver based upon at least one of the performed verification procedures; and wherein at least one of the verification procedures comprises utilizing biometric data that can change over time for a particular person thereby potentially permitting an verification failure of that person based on a comparison of current biometric measures against a previously-produced template of the same characteristics, and automatically updating the previously-produced template.

2. The method as recited in claim 1, wherein the automatic update is achieved in a multi-modal verification system wherein the verification system uses more than one biometric/PIN-code/smart card and the second driver verification procedure is different from the first driver verification procedure.

3. The method as recited in claim 1, wherein the at least one verification procedure utilizes updated face recognition biometric data that has changed over time.

4. The method as recited in claim 1, wherein upon the operator entering the vehicle a prompt is issued requiring identity verification using PIN-code, fingerprint and face recognition, and after which the system verifies the operator identity using PIN-code and face recognition and uses the fingerprint biometric to update a fingerprint template in the database.

5. The method as recited in claim 1, wherein multiple driver verification procedures are performed during a single driving shift of the operator, the single driving shift extending from when the operator enters the vehicle for the first time when coming onto work and until the operator finally leaves the vehicle when leaving work.

6. The method as recited in claim 1, wherein the second driver verification procedure is performed only when an operator of the vehicle is not determined to be an authorized driver based on performance of the first driver verification procedure.

7. The method as recited in claim 1, wherein at least one of the first and second driver verification procedures is a passive verification test that does not require conscious interaction by the operator in association with the performance of the at least one of the driver verification procedures.

8. The method as recited in claim 7, wherein the passive verification test comprises a scan of a physical characteristic of the operator from which an image is compared to a set of control images representative of authorized drivers of the vehicle.

9. The method as recited in claim 8, wherein the scanned physical characteristic of the operator is the iris of at least one of the operator's eyes.

10. The method as recited in claim 8, wherein the scanned physical characteristic of the operator is the retina of at least one of the operator's eyes.

11. The method as recited in claim 8, wherein the scanned physical characteristic is a facial thermogram of the operator.

12. The method as recited in claim 8, wherein the passive verification test has a failure rate due to at least one environmental condition that prevents an adequate scan of the physical characteristic of the operator from being obtained.

13. The method as recited in claim 12, wherein the at least one environmental condition is insufficient lighting.

14. The method as recited in claim 1, wherein at least one of the first and second driver verification procedures is an active verification test that requires conscious interaction by the operator in association with the performance of the at least one of the driver verification procedures.

15. The method as recited in claim 14, wherein the active verification test comprises a scan of a physical characteristic of the operator from which an image is compared to a set of control images representative of authorized drivers of the vehicle, the scan requiring that the operator place a body portion on a scanner.

16. The method as recited in claim 15, wherein the scanned physical characteristic of the operator is a print pattern of at least one of the operator's fingers.

17. The method as recited in claim 15, wherein the scanned physical characteristic is the hand geometry of the operator.

18. The method as recited in claim 14, wherein the active verification test comprises issuing a request to the operator to input a personal verification number into the system identifying the operator as an authorized driver.

19. The method as recited in claim 14, wherein the active verification test comprises reading hard-coded verification information on a verification card presented by the operator and requesting that the operator input a personal verification number into the system which corresponds to a hard-coded verification number read from the verification card.

20. The method as recited in claim 14, wherein the active verification test comprises issuing a command to the operator to speak a prescribed phrase and recording the spoken phrase as a speech pattern and comparing that pattern to a set of control speech patterns of authorized drivers of the vehicle.

21. A method for assuring that the operator of a vehicle is an authorized driver, the method comprising:

utilizing an onboard, multi-mode driver verification system to ascertain whether an operator is an authorized driver;

performing a first driver verification procedure on a present operator of the vehicle and determining whether the present operator is an authorized or unauthorized driver of the vehicle;

performing a second driver verification procedure on the present operator of the vehicle and determining whether the present operator is an authorized or unauthorized driver of the vehicle, wherein the second driver verification procedure is different from the first driver verification procedure;

wherein the first and second driver verification procedures are performed with a time interval therebetween, the time interval being dependent upon the nature of the work being performed by the operator and upon one or more of a frequency of vehicle stops and a frequency of times the operator enters into and exits from the vehicle;

exercising a remedial measure to avert potentially negative impact when the present operator of the vehicle is determined to be an unauthorized driver based upon at least one of the performed verification procedures; and wherein the first one of the verification procedures comprises utilizing biometric data that can change over time for a particular person thereby potentially permitting a verification failure of that person based on a comparison of current biometric measures against a previously-produced template of the same characteristics, and automatically updating the previously-produced template if the second one of the verification determines that the second verification procedure successfully verified the present operator as an authorized driver.

22. The method as recited in claim 1, wherein the second driver verification procedure is the same as the first driver verification procedure.

23. The method as recited in claim 1, further comprising initiating the second driver verification immediately following a determination that the present operator is an unauthorized driver in the first driver verification procedure.

24. The method as recited in claim 1, wherein the verification system comprises at least one identification system.

25. The method as recited in claim 1, wherein at least one of the verification procedures comprises at least one identification procedure.

* * * * *